United States Patent [19]
Takeuchi et al.

[11] Patent Number: 5,978,456
[45] Date of Patent: *Nov. 2, 1999

[54] CHARGING UNIT PRICE DETERMINATION/INFORMATION APPARATUS AND COMMUNICATION SYSTEM HAVING CHARGING UNIT PRICE INFORMATION FUNCTION

[75] Inventors: Yoshio Takeuchi, Omiya; Fumio Watanabe, Fujimi, both of Japan

[73] Assignee: Kokusai Denshin Denwa Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/541,119

[22] Filed: Oct. 11, 1995

[30] Foreign Application Priority Data

Oct. 25, 1994 [JP] Japan ................................. 6-260178
Mar. 1, 1995 [JP] Japan ................................. 7-041735

[51] Int. Cl.$^6$ ................................. H04M 15/00
[52] U.S. Cl. .................. 379/131; 379/112; 379/114; 379/221
[58] Field of Search ................................. 379/112, 113, 379/114, 130, 133, 134, 140, 131, 58, 59, 111, 115, 221; 455/406–408

[56] References Cited

U.S. PATENT DOCUMENTS

| | | | |
|---|---|---|---|
| 4,594,477 | 6/1986 | Noirot ................................. | 379/221 |
| 4,979,207 | 12/1990 | Baum et al. . | |
| 5,046,085 | 9/1991 | Godsey et al. . | |
| 5,173,933 | 12/1992 | Jabs et al. ................................. | 379/111 |
| 5,185,785 | 2/1993 | Funk et al. . | |
| 5,303,297 | 4/1994 | Hillis ................................. | 379/114 |
| 5,425,085 | 6/1995 | Weinberger et al. ................................. | 379/112 |
| 5,473,630 | 12/1995 | Penzias et al. ................................. | 379/130 |
| 5,553,124 | 9/1996 | Brinskele ................................. | 379/114 |
| 5,799,072 | 8/1998 | Vulcan et al. ................................. | 379/114 |
| 5,862,203 | 1/1999 | Wulkan et al. ................................. | 379/114 |

FOREIGN PATENT DOCUMENTS

| | | |
|---|---|---|
| 0526118 | 3/1993 | European Pat. Off. . |
| 0 647 055 A1 | 5/1995 | European Pat. Off. . |
| 5030396 | 2/1993 | Japan . |
| 6-245253 | 9/1993 | Japan . |
| 2 245 545 | 1/1992 | United Kingdom . |
| 2245454 | 1/1992 | United Kingdom . |
| 9603832A1 | 2/1996 | WIPO . |
| 9624226A1 | 8/1996 | WIPO . |

*Primary Examiner*—Curtis A. Kuntz
*Assistant Examiner*—Duc Nguyen
*Attorney, Agent, or Firm*—Birch, Stewart, Kolasch & Birch, LLP

[57] ABSTRACT

A calling location and a receiving location are analyzed by called party number analysis means by processing a called party number for specifying a communication terminal at the receiving side transmitted by a communication terminal at the calling side is processed, a charging unit price is determined by charging unit price determination means by referring to contents of a table memory storing a table of charging unit price using the calling location and the receiving location as parameters, and the information of charging unit price is informed to a communication terminal through a charging unit price determination/information apparatus, whereby a communication fee according to the receiving destination can be informed to the caller, or the receiver.

29 Claims, 36 Drawing Sheets

| | Through a single network | Through a plurality of networks | |
|---|---|---|---|
| | | Charging network informs charging unit price | Other than charging network informs charging unit price |
| Charging unit price is unitarily determined from called party number | (A-1) | (B-1) | (C-1) |
| Charging unit price depends on relay network | – | (B-2) | (C-2) |
| Charging unit price depends on receyving terminal location | (A-2) | (B-3) | (C-3) |

FIG. 3

|  | Through a single network | Through a plurality of networks ||
|---|---|---|---|
|  |  | Charging network informs charging unit price | Other than charging network informs charging unit price |
| Charging unit price is unitarily determined from called party number | (A-1) | (B-1) | (C-1) |
| Charging unit price depends on relay network | − | (B-2) | (C-2) |
| Charging unit price depends on receyving terminal location | (A-2) | (B-3) | (C-3) |

FIG. 12

Calling location : Tokyo (03 area)

| Receiving location identification code | Charging unit price (sec/10 yen) |
|---|---|
| 0 1 1 | 1 0 |
| 0 1 2 3 | 1 0 |
| 0 1 2 6 | 1 0 |
| ⋮ | ⋮ |
| 0 4 8 | 3 5 |
| ⋮ | ⋮ |

FIG. 13

Calling location : Tokyo

| Receiving location | Charging unit price (sec/10 yen) |
|---|---|
| Hokkaido | 1 2 |
| Aomori pref. | 1 4 |
| . | . |
| . | . |
| . | . |
| Saitama pref. | 3 0 |
| Tokyo | 3 8 |
| . | . |
| . | . |

FIG. 14

Calling location : Tokyo (03 area)

| Domestic relay network identification code | Receiving location identification code | Charging unit price (sec/10 yen) |
|---|---|---|
| 0 0 7 0 | 0 1 1<br>0 1 2 3<br>0 1 2 6<br>⋮<br>0 4 8<br>⋮ | 1 2<br>1 1<br>1 1<br>⋮<br>4 0<br>⋮ |
| 0 0 7 7 | 0 1 1<br>0 1 2 3<br>0 1 2 6<br>⋮<br>0 4 8<br>⋮ | 1 2<br>1 2<br>1 2<br>⋮<br>4 5<br>⋮ |
| 0 0 8 8 | 0 1 1<br>0 1 2 3<br>0 1 2 6<br>⋮<br>0 4 8<br>⋮ | 1 1<br>1 1<br>1 1<br>⋮<br>4 8<br>⋮ |

FIG. 15

Calling location : Japan

| International relay network identification code | National number | Charging unit price (yen/6 sec) |
|---|---|---|
| 0 0 1 | 1<br>2 0<br>2 1 2<br>.<br>.<br>.<br>8 2<br>.<br>.<br>. | 1 5<br>4 0<br>4 0<br>.<br>.<br>.<br>1 5<br>.<br>.<br>. |
| 0 0 4 1 | 1<br>2 0<br>2 1 2<br>.<br>.<br>.<br>8 2<br>.<br>.<br>. | 1 5<br>4 1<br>4 1<br>.<br>.<br>.<br>1 6<br>.<br>.<br>. |
| 0 0 6 1 | 1<br>2 0<br>2 1 2<br>.<br>.<br>.<br>8 2<br>.<br>.<br>. | 1 4<br>4 2<br>4 2<br>.<br>.<br>.<br>1 6<br>.<br>.<br>. |

FIG. 16

Calling location : Tokyo

| Receiving location | Charging unit price (sec/10 yen) |
|---|---|
| Hokkaido | 1 0 |
| Aomori pref. | 1 2 |
| . | . |
| . | . |
| . | . |
| Saitama pref. | 2 5 |
| Tokyo | 3 0 |
| . | . |
| . | . |

FIG.21

|  | Through a single network | Through a plurality of networks ||
|---|---|---|---|
|  |  | Charging network informs charging unit price | Other than charging network informs charging unit price |
| Charging unit price is unitarily determined from called party number | (A-1) | (B-1) | (C-1) |
| Charging unit price depends on relay network | — | (B-2) | (C-2) |
| Charging unit price depends on receyving terminal location | (A-2) | (B-3) | (C-3) |

FIG. 30

Calling location : Tokyo (03 area)

| Receiving location identification code | Charging unit price (sec/10 yen) |
|---|---|
| 0 1 1 | 1 0 |
| 0 1 2 3 | 1 0 |
| 0 1 2 6 | 1 0 |
| . | . |
| . | . |
| . | . |
| 0 4 8 | 3 5 |
| . | . |
| . | . |

FIG.31

Calling location : Tokyo

| Receiving location | Charging unit price (sec/10 yen) |
|---|---|
| Hokkaido | 1 2 |
| Aomori pref. | 1 4 |
| . | . |
| . | . |
| . | . |
| Saitama pref. | 3 0 |
| Tokyo | 3 8 |
| . | . |
| . | . |

FIG.32

Calling location : Tokyo (03 area)

| Domestic relay network identification code | Receiving location identification code | Charging unit price (sec/10 yen) |
|---|---|---|
| 0 0 7 0 | 0 1 1<br>0 1 2 3<br>0 1 2 6<br>.<br>.<br>.<br>0 4 8<br>.<br>.<br>. | 1 2<br>1 1<br>1 1<br>.<br>.<br>.<br>4 0<br>.<br>.<br>. |
| 0 0 7 7 | 0 1 1<br>0 1 2 3<br>0 1 2 6<br>.<br>.<br>.<br>0 4 8<br>.<br>.<br>. | 1 2<br>1 2<br>1 2<br>.<br>.<br>.<br>4 5<br>.<br>.<br>. |
| 0 0 8 8 | 0 1 1<br>0 1 2 3<br>0 1 2 6<br>.<br>.<br>.<br>0 4 8<br>.<br>.<br>. | 1 1<br>1 1<br>1 1<br>.<br>.<br>.<br>4 8<br>.<br>.<br>. |

FIG.33

Calling location : Japan

| International relay network identification code | National number | Charging unit price (yen/6 sec) |
|---|---|---|
| 0 0 1 | 1<br>2 0<br>2 1 2<br>:<br>:<br>8 2<br>:<br>: | 1 5<br>4 0<br>4 0<br>:<br>:<br>1 5<br>:<br>: |
| 0 0 4 1 | 1<br>2 0<br>2 1 2<br>:<br>:<br>8 2<br>:<br>: | 1 5<br>4 1<br>4 1<br>:<br>:<br>1 6<br>:<br>: |
| 0 0 6 1 | 1<br>2 0<br>2 1 2<br>:<br>:<br>8 2<br>:<br>: | 1 4<br>4 2<br>4 2<br>:<br>:<br>1 6<br>:<br>: |

FIG.34

Calling location : Tokyo

| Receiving location | Charging unit price (sec/10 yen) |
|---|---|
| Hokkaido | 10 |
| Aomori pref. | 12 |
| . | . |
| . | . |
| . | . |
| Saitama pref. | 25 |
| Tokyo | 30 |
| . | . |
| . | . |

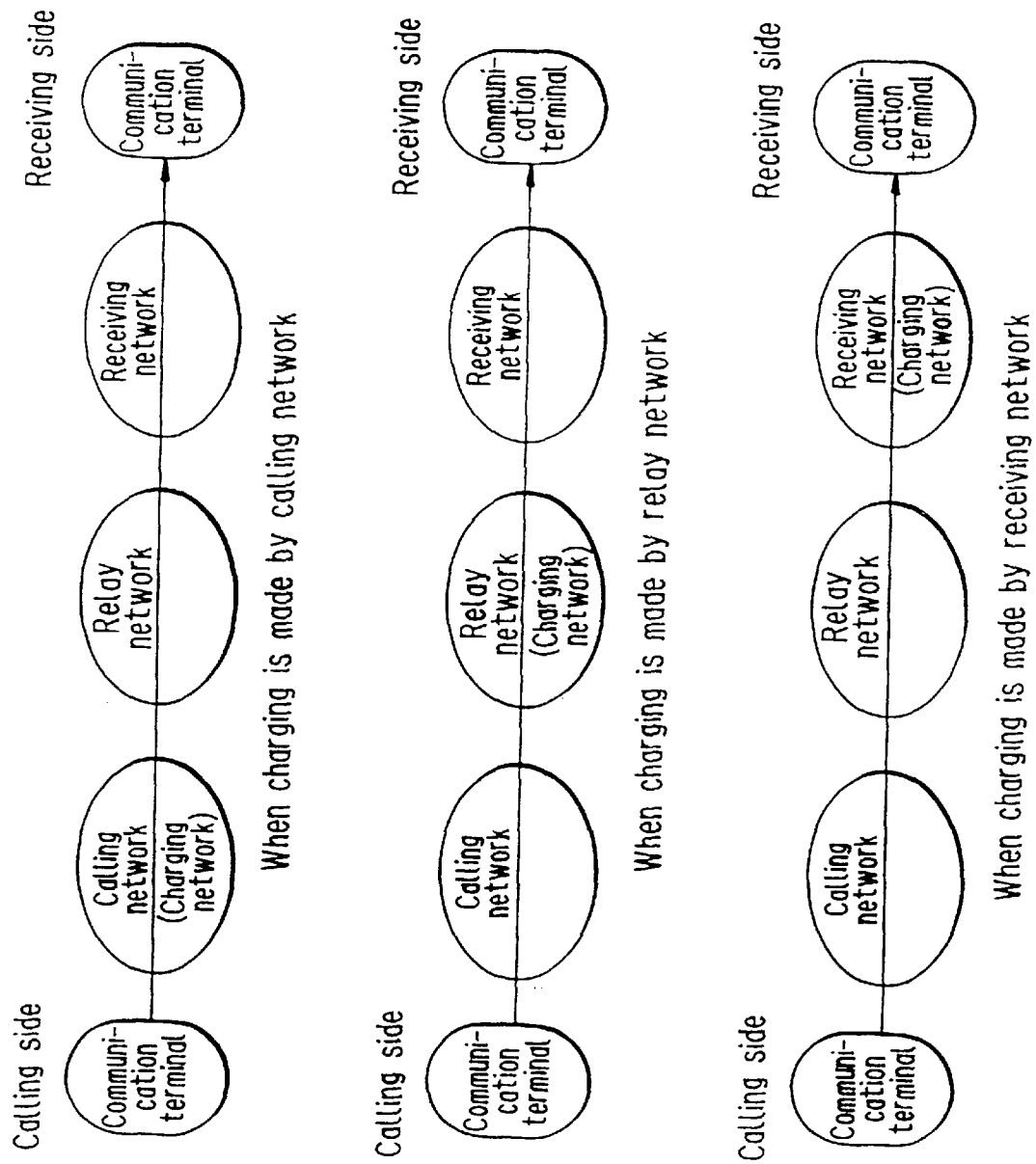

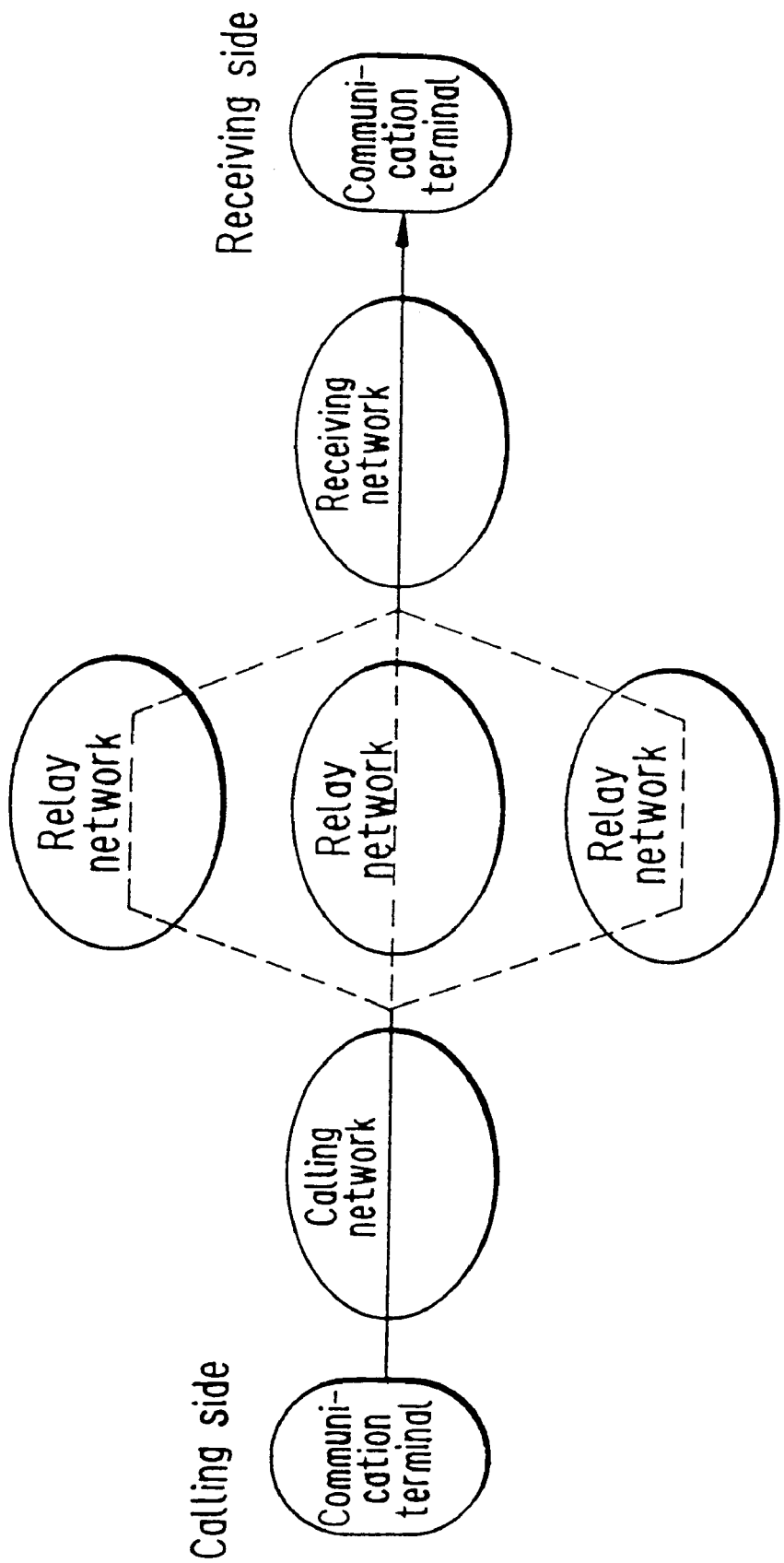

CHARGING UNIT PRICE DETERMINATION/INFORMATION APPARATUS AND COMMUNICATION SYSTEM HAVING CHARGING UNIT PRICE INFORMATION FUNCTION

FIELD OF THE INVENTION

This invention relates to a charging unit price determination/information apparatus and a communication system having a charging unit price information function, specifically useful for a case where the reception terminal is a mobile terminal, or charging is made to the receiving side in collect call or the like.

BACKGROUND OF THE INVENTION

When calling a mobile terminal in a mobile telephone system, which recently is rapidly spreading, for example, a caller at the calling side dials a communication network access code, which is a specific number such as 030 or 040, and then dials a called party number which specifies the terminal at the reception side. Then, at the communication network (hereinafter referred to as "network") side, a charging unit price, which is a unit price of communication fee, is selected according to the mobile network access code dialed by the caller at the calling side, to make charging. That is, at the network side, the location of the mobile terminal is not determined.

As described above, in the mobile telephone system at present, charging processing is made according to the mobile communication network access code dialed by the caller at the calling side. However, a system for automatically charging according to location information of the mobile terminal can naturally be considered.

In a system in which the location of the mobile terminal is determined at the network side and the charging unit price is determined for charging, the charging unit price must be informed to the caller. This is because the communication fee varies with the location of the mobile terminal. In other words, a communication fee unexpected by the caller may be charged.

The requirement for informing the charging unit price is particularly large when the reception side is a mobile terminal, but in other cases, it will often be convenient if the charging unit price can be known by the caller. If it can be known, the caller will become possible to select, not only calling consciously of the charging unit price, but also not calling depending on the charging unit price.

SUMMARY OF THE INVENTION

Such information of the charging unit price must be made not only to the calling side, but also to the receiving side in collect call and the like. Further, necessity for the charging unit price information is often larger in collect call and the like.

In view of the above-described prior art problems, a first object of the present invention is to provide a charging unit price determination/information apparatus and a communication system having a charging unit price information function, which can inform the caller of the unit price of communication fee according to the reception destination.

A second object of the present invention is to provide a communication system having a charging unit price information function to inform the receiver of a communication fee unit price according to the receiving destination and a charging unit price determination/information apparatus used for the system.

The present invention, which attains the above object, includes:

(1) called party number analyzer for analyzing a called party number for specifying a reception destination called by a communication terminal at the calling side; charging unit price determination unit for specifying a calling location, a receiving location, and a communication path from the calling location to the receiving location, and determining the charging unit price; and charging unit price information unit for informing information on the charging unit price determined by the charging unit price determination means to a communication terminal at the calling side.

(2) In the invention described in (1), having a table memory storing charging unit prices using parameters of calling locations and receiving locations or relay networks as a table, wherein the charging unit price determination means determines a charging unit price with reference to the contents of the table memory.

(3) In the invention described in (2), the table stored in the table memory is prepared by previously downloading stored charging unit price information for charging owned by a charging network, which is another communication network, onto the table memory.

(4) In the invention described in (2) or (3), the charging unit price determination unit determines a charging unit price by specifying the location of the receiving side communication terminal with reference to a mobile terminal location database owned by a mobile communication network as another communication network and a receiving network and storing the location of the mobile terminal as the communication terminal at the receiving side.

(5) In the invention described in (2) or (3), the charging unit price determination unit determines a charging unit price with reference to a section unit price of the mobile communication network based on the location of the receiving side communication terminal obtained by referring to a mobile terminal location database owned by a mobile communication network as another communication network and a receiving network and storing the location of the mobile terminal as the communication terminal at the receiving side.

(6) In the invention described in (1), the charging unit price determination unit determines a charging unit price according to the charging unit price information obtained as a response to an inquiry, for a charging unit price using parameters of calling location and receiving location or relay network to a charging unit price database storing information for charging owned by a charging network as another communication network for the charging unit price.

(7) In the invention described in any one of (1) to (6), when there are a plurality of relay networks, connected in parallel, to communication terminals at the receiving side, comprising relay network determination unit for selecting one of the relay networks according to the caller's will.

(8) In the invention described in any one of (1) to (6), comprising acknowledge means for connecting or disconnecting the communication line according to the caller's will whether connecting or disconnecting the communication.

(9) In the invention described in any one of (1) to (6), including the relay network determination unit and the acknowledge unit.

(10) A called party number transmitted by a communication terminal at the calling side for specifying the receiving destination is analyzed, a charging unit price is determined by referring to a table in the communication network of itself storing the charging unit price using the calling location and receiving location or relay network as parameters, and charging unit price information is informed to the communication terminal at the calling side.

(11) When, through a single communication network to the receiving side, the communication terminal at the receiving side is mobile terminal, the receiving destination is specified by referring to the contents of a mobile terminal location database owned by the communication network of itself and storing the location of mobile terminal, a charging unit price is determined by referring to a table in the communication network of itself storing charging unit prices using the calling location and receiving location as parameters, and the charging unit price information is informed to the communication terminal at the calling side.

(12) When, through a plurality of communication networks to the receiving side, the communication terminal at the receiving side is a mobile terminal belonging to a mobile communication network different from the communication network of itself, the receiving destination is specified by referring to the contents of a mobile terminal location database owned by the mobile communication network and storing the location of mobile terminal, a charging unit price is determined by referring to a table in the communication network of itself storing the charging unit price using the calling location and receiving location as parameters, and the charging unit price information is informed to the communication terminal at the calling side.

(13) In a communication system through a plurality of communication networks to the receiving side, a table is prepared for determining a charging unit price by previously downloading the storage of a charging unit price information database owned by a charging network as another communication network to a table memory, the called party number for specifying the receiving destination transmitted by the communication terminal at the calling side is analyzed, a charging unit price is determined by referring to the table using the calling location and the receiving location or the relay network as parameters, and the charging unit price information is informed to the communication terminal at the calling side.

(14) In a communication system through a plurality of communication networks to the receiving side, a called party number for specifying the receiving destination transmitted by the communication terminal at the calling side is analyzed, a charging unit price is determined by referring to the storage of a charging unit price information database owned by a charging network as another communication network using the calling location and the receiving location or the relay network as parameters, and the charging unit price information is informed to the communication terminal at the calling side.

(15) In a communication system through a plurality of communication networks to the receiving side, having a communication network of itself for informing the charging unit price separately from a charging network having a charging unit price information database as information for charging and a mobile communication network having a mobile terminal location database storing the location of the mobile terminal as the communication terminal at the receiving side, a table for setting the charging unit price is prepared by previously downloading the storage of a charging unit price information database to a table memory in the communication network of itself, the receiving destination is specified by referring to the storage of the mobile terminal location database, the charging unit price is determined by referring to the table using the calling location and the receiving location in the communication network of itself as parameters, and the charging unit price information is informed to the communication terminal at the calling side.

(16) In a communication system through a plurality of communication networks to the receiving side, having a communication network of itself for informing the charging unit price separately from a charging network having a charging unit price information database as information for charging and a mobile communication network having a mobile terminal location database storing the location of the mobile terminal as the communication terminal at the receiving side, when the mobile communication network is the charging network and has a charging unit price information database and a location information database in the same network, to an inquiry for the charging unit price from the communication network of itself to the charging unit price information database, the charging unit price information database inquires the location information database of the location and informs the charging unit price according to the location to the communication network of itself to determine the charging unit price in the communication network of itself, and the charging unit price information is informed to the communication terminal at the calling side.

(17) In a communication system through a plurality of communication networks to the receiving side, having a communication network of itself for informing the charging unit price separately from a charging network having a charging unit price information database as information for charging and a mobile communication network having a mobile terminal location database storing the location of the mobile terminal as the communication terminal at the receiving side, To an inquiry from the communication network of itself for a charging unit price to a charging unit price information database of a charging network, the charging unit price information database inquires the mobile communication network as another network of the location and informs the charging unit price according to the location to the communication network of itself to determine the charging unit price in the communication network of itself, and the charging unit price information is informed to the communication terminal at the calling side.

The present invention, which attains the second object, includes:

(18) a called party number analyzer for analyzing a called party number for specifying a reception destination called by a communication terminal at the calling side; a charging unit price determination unit for specifying a calling location, a receiving location, and a communication path from the calling location to the receiving location, and determining the charging unit price; and a charging unit price information unit for informing information on the charging unit price determined by the charging unit price determination unit to a communication terminal at the receiving side.

(19) In the invention described in (18), having a table memory storing charging unit prices using parameters of calling location and receiving location or relay network as a table, wherein the charging unit price determination unit determines a charging unit price with reference to the contents of the table memory.

(20) In the invention described in (19), the table stored in the table memory is prepared by previously downloading stored charging unit price information for charging owned by a charging network, which is another communication network, onto the table memory.

(21) In the invention described in (19) or (20), the charging unit price determination unit determines a charging unit price by specifying the location of the receiving side communication terminal with reference to a mobile terminal location database owned by a mobile communication network as another communication network and a receiving network and storing the location of the mobile terminal as the communication terminal at the receiving side.

(22) In the invention described in (19) or (20), the charging unit price determination unit determines a charging unit price with reference to a section unit price of the mobile communication network based on the location of the receiving side communication terminal obtained by referring to a mobile terminal location database owned by a mobile communication network as another communication network and a receiving network and storing the location of the mobile terminal as the communication terminal at the receiving side.

(23) In the invention described in (18), the charging unit price determination unit determines a charging unit price according to the charging unit price information obtained as a response to an inquiry, for a charging unit price using parameters of calling location and receiving location or relay network to a charging unit price database storing information for charging owned by a charging network as another communication network for the charging unit price.

(24) In the invention described in any one of (18) to (23), further comprising acknowledge unit for connecting or disconnecting the communication line according to the receiver's will as to whether connecting or disconnecting the communication after charging unit price information is received from the charging unit price information means.

(25) A called party number transmitted by a communication terminal at the calling side for specifying the receiving destination is analyzed, a charging unit price is determined by referring to a table in the communication network of itself storing the charging unit price using the calling location and receiving location or relay network as parameters, and charging unit price information is informed to the communication terminal at the receiving side.

(26) When, through a single communication network to the receiving side, the communication terminal at the receiving side is mobile terminal, the receiving destination is specified by referring to the contents of a mobile terminal location database owned by the communication network of itself and storing the location of mobile terminal, a charging unit price is determined by referring to a table in the communication network of itself storing charging unit prices using the calling location and receiving location as parameters, and the charging unit price information is informed to the communication terminal at the receiving side.

(27) When, through a plurality of communication networks to the receiving side, the communication terminal at the receiving side is a mobile terminal belonging to a mobile communication network different from the communication network of itself, the receiving destination is specified by referring to the contents of a mobile terminal location database owned by the mobile communication network and storing the location of mobile terminal, a charging unit price is determined by referring to a table in the communication network of itself storing the charging unit price using the calling location and receiving location as parameters, and the charging unit price information is informed to the communication terminal at the receiving side.

(28) In a communication system through a plurality of communication networks to the receiving side, a table is prepared for determining a charging unit price by previously downloading the storage contents of a charging unit price information database owned by a charging network as another communication network to a table memory, the called party number for specifying the receiving destination transmitted by the communication terminal at the calling side is analyzed, a charging unit price is determined by referring to the table using the calling location and the receiving location or the relay network as parameters, and the charging unit price information is informed to the communication terminal at the receiving side.

(29) In a communication system through a plurality of communication networks to the receiving side, a called party number for specifying the receiving destination transmitted by the communication terminal at the calling side is analyzed, a charging unit price is determined by referring to the storage contents of a charging unit price information database owned by a charging network as another communication network using the calling location and the receiving location or the relay network as parameters, and the charging unit price information is informed to the communication terminal at the receiving side.

(30) In a communication system through a plurality of communication networks to the receiving side, having a communication network of itself for informing the charging unit price separately from a charging network with a charging unit price information database as information for charging and a mobile communication network having a mobile terminal location database storing the location of the mobile terminal as the communication terminal at the receiving side, a table for setting the charging unit price is prepared by previously downloading the storage of a charging unit price information database to a table memory in the communication network of itself, the receiving destination is specified by referring to the storage contents of the mobile terminal location database, the charging unit price is determined by referring to the table using the calling location and the receiving location in the communication network of itself as parameters, and the charging unit price information is informed to the communication terminal at the receiving side.

(31) In a communication system through a plurality of communication networks to the receiving side, having a communication network of itself for informing the charging unit price separately from a charging network having a charging unit price information database as information for charging and a mobile communication network having a mobile terminal location database storing the location of the mobile terminal as the communication terminal at the receiving side, when the mobile communication network is the charging network and has a charging unit price information database and a location information database in the same network, to an inquiry for the charging unit price from the communication network of itself to the charging unit price information database, the charging unit price information database inquires the location information database of the location and informs the charging unit price according to the location to the communication network of itself to determine the charging unit price in the communication network of itself, and the charging unit price information is informed to the communication terminal at the receiving side.

(32) In a communication system through a plurality of communication networks to the receiving side, having a communication network of itself for informing the charging unit price separately from a charging network having a charging unit price information database as information for charging and a mobile communication network having a mobile terminal location database storing the location of the mobile terminal as the communication terminal at the receiving side, to an inquiry from the communication network of itself for a charging unit price to a charging unit price information database of a charging network, the charging unit price information database inquires the mobile communication network as another network of the location and informs the charging unit price according to the location to the communication network of itself to determine the charging unit price in the communication network of itself, and the charging unit price information is informed to the communication terminal at the receiving side.

According to the invention (1), the charging unit price is informed to the communication terminal at the calling side.

According to the invention (2), in the determination of the charging unit price, the table of charging unit price using the calling location and the receiving location as parameters.

According to the invention (3), the above table is prepared by previously downloading charging unit price information owned by another communication network.

According to the invention (4), when specifying the receiving location, location information of mobile terminal owned by the mobile communication network as the receiving network is utilized.

According to the invention (5), a section charging unit price as the charging unit price in the mobile communication network as the receiving network is informed from the mobile communication network, and the total charging unit price is determined according to the section charging unit price.

According to the invention (6), the charging unit price can be determined using information for charging owned by the charging network as another communication network.

According to the invention (7), a relay network can be optionally selected according to the caller's will.

According to the invention (8), after the charging unit price is informed, whether or not the communication is continued can be selected at the caller's option.

According to the invention (9), a relay network is selected according to the caller's will, and whether or not the communication is continued can be determined.

The invention (10) functions as a system for cases where through a single network, the receiving side is a fixed terminal, or where through a plurality of networks, the receiving terminal is a fixed terminal, and the communication network of itself informing the charging unit price is the charging network.

The invention (11) functions as a system in a case where through a single network, the receiving side is mobile terminal.

The invention (12) functions as a system in a case where through a plurality of networks, the receiving side is a mobile terminal, and the communication network of itself is the charging network.

The inventions (13) and (14) function as systems for cases where through a plurality of networks, the receiving side terminal is a fixed terminal, and a communication network other than the communication network of itself is the charging network.

The inventions (15), (16), and (17) function as systems for cases where through a plurality of networks, the receiving side terminal is a mobile terminal, and a communication network other than the communication network of itself is the charging network.

According to the invention (18), the charging unit price is informed to the communication terminal at the receiving side.

According to the invention (19), in the determination of the charging unit price, the table of charging unit price using the calling location and the receiving location as parameters is referred to.

According to the invention (20), the above table is prepared by previously downloading charging unit price information owned by the charging network as another communication network.

According to the invention (21), when specifying the receiving location, location information of mobile terminal owned by the mobile communication network as the receiving network is utilized.

According to the invention (22), a section charging unit price as the charging unit price in the mobile communication network as the receiving network is informed from the mobile communication network, and the total charging unit price is determined according to the section charging unit price.

According to the invention (23), the charging unit price can be determined using information for charging owned by the charging network as another communication network.

According to the invention (24), after the charging unit price is informed, whether or not the communication is continued can be selected at the receiver's option.

The invention (25) functions as a system for cases where through a single network, the receiving side is a fixed terminal, or where through a plurality of networks, the receiving terminal is a fixed terminal, and the communication network of itself informing the charging unit price is the charging network.

The invention (26) functions as a system in a case where through a single network, the receiving side is mobile terminal.

The invention (27) functions as a system in a case where through a plurality of networks, the receiving side is a mobile terminal, and the communication network of itself is the charging network.

The inventions (28) and (29) function as systems for cases where through a plurality of networks, the receiving side terminal is a fixed terminal, and a communication network other than the communication network of itself is the charging network.

The inventions (30), (31), and (32) function as systems for cases where through a plurality of networks, the receiving side terminal is a mobile terminal, and a communication network other than the communication network of itself is the charging network.

BRIEF DESCRIPTION OF THE DRAWINGS

FIG. 3 is a table showing types of paths from the calling location to the receiving location in the determination of the charging unit price;

FIG. 12 is a diagram showing a first table used for charging unit price determination in the embodiment of the present invention;

FIG. 13 is a diagram showing a second table;

FIG. 14 is a diagram showing a third table;

FIG. 15 is a diagram showing a fourth table;

FIG. 16 is a diagram showing a fifth table;

FIG. 21 is a table showing types of paths from the calling location to the receiving location in the determination of the charging unit price;

FIG. 30 is a diagram showing a first table used for charging unit price determination in the embodiment of the present invention;

FIG. 31 is a diagram showing a second table;

FIG. 32 is a diagram showing a third table;

FIG. 33 is a diagram showing a fourth table;

FIG. 34 is a diagram showing a fifth table;

FIG. 35 is a diagram for explaining a charging network in a communication path having a relay network;

FIG. 36 is a diagram schematically showing a communication path when a plurality of relay networks exist in parallel.

DETAILED DESCRIPTION OF PREFERRED EMBODIMENTS

A first embodiment of the present invention will be described in detail with reference to the drawings.

First, terms used in the description of the present embodiment are defined.

<Charging unit price>

A unit price of fee charged to a user or subscriber.

<Section unit price>

A unit price stipulated for a section of a communication line for use in payment between enterprises.

<Charging unit price information service identification code>

A code for a caller to inform reception of unit price information service to a network.

<International network access code>

A code indicating communication through an international network.

<International relay network identification code>

A code to specify an international relay network when a plurality of international relay networks are present in international communication.

<Country code>

A code for specifying the country of the receiving destination in international communication.

<Domestic relay network identification code>

A code for specifying a domestic relay network when a plurality of domestic relay networks are present in domestic communication.

<Receiving network identification code>

A code for specifying a receiving network.

<Mobile communication network access code>

A code for specifying that the receiving destination is a mobile communication network.

<Mobile communication enterprise identification code>

A code for specifying a mobile communication enterprise when the receiving destination is a mobile communication network.

<Receiving location identification code>

A code for specifying MA (unit fee area) of receiving location, corresponding to the area code.

<Subscriber number>

A number for identifying a subscriber in the subscribing network, except the area code.

<Area designating system>

A system for designating a receiving area using a mobile communication network access code differing depending on the distance to the receiving destination when calling a mobile terminal.

<Area undesignating system>

A system using a single mobile communication network access code independent of the distance to the receiving destination when calling a mobile terminal.

<Charging network>

A network having a function to measure/calculate a communication fee per call.

Figure 1:
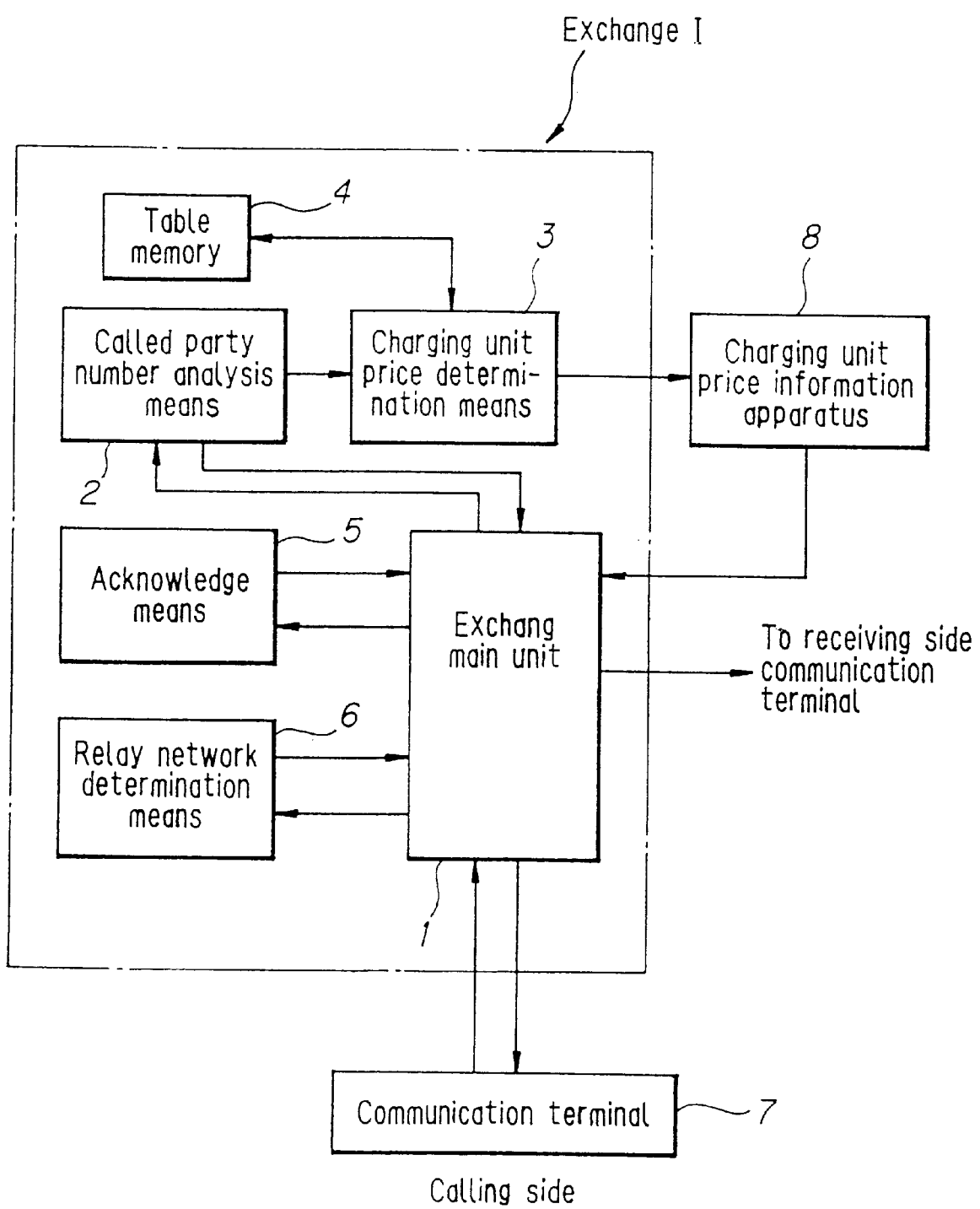
FIG. 1 is a block diagram showing basic structure of the charging unit price determination/information apparatus according to an embodiment of the present invention.

FIG. 1 is a block diagram showing a charging unit price determination/information apparatus according to the present embodiment. As shown in the Figure, the present embodiment mainly includes an exchange I. The exchange I includes called party number analysis unit 2, charging unit price determination unit 3, a table memory 4, acknowledge unit 5, and relay network determination unit 6, in addition to a exchange main unit 1.

The exchange main unit 1 makes exchange work as its original work, and also makes exchange of predetermined signals with other units. That is, it has functions to connect a communication terminal 7 at the calling side with a communication terminal at the receiving side, exchange signals with the called party number analysis unit 2, the acknowledge unit 5, and the relay network determination unit 6, and receive charging unit price information, which is an output signal of a charging unit price information device 8, and send it to the communication terminal 7.

The communication terminal 7 transmits a signal to the exchange main unit I of a predetermined communication network (hereinafter referred to as "network") to request calling. At this moment, the communication terminal 7 informs, if necessary, the international relay network identification code, country code or domestic relay network identification code, receiving network identification code, and receiving location identification code, and when the receiving destination is a mobile communication network, mobile communication network access code, and mobile communication enterprise identification as the called party number to specify the receiving destination. When occasion demands, the charging unit price information service identification code may be added to the called party number to indicate reception of a charging unit price report. These are transmitted from the communication terminal 7 to the network as PB signal or information included in the D channel message for the case of ISDN signal.

The called party number analysis unit 2 analyzes the called party number from the communication terminal 7 transmitted through the exchange main unit 1, and sends the information to the exchange main unit I and the charging unit price determination unit 3.

As a result, the exchange main unit 1 performs the predetermined exchange work, and determines whether or not the charging unit price to the caller of the communication terminal 7. For example, when it is determined by whether or not the charging unit price information service identification code is included in the called party number transmitted from the communication terminal 7 to the network, the caller can designate whether or not to receive the charging unit price information per call. Further, when the caller previously registers the network as to whether or not to receive the charging unit price information, if the information to specify the communication terminal 7 of the caller, such as the caller's number or the identification number of the interface of the communication terminal 7 used by the caller, is known at the exchange I at the network side, whether or not to make the charging unit price information to the communication terminal 7 of the caller can be determined from the information, without attaching the charging unit price information service identification code per call. Further, when the charging unit price is always informed, these determinations are not required.

The charging unit price determination unit 3 specifies the calling location, receiving location, and if necessary, the relay network, and determines the charging unit price with reference to the corresponding table of the table memory 4 according to the information. In this case, information of the calling location is supplied always from the called party number analysis unit 2, but information of the receiving location may be supplied from another network, that is, the mobile terminal location database of the mobile communication network. The latter may correspond to the case where the receiving side communication terminal is a mobile terminal.

Further, there is a case where, without referring to the table of the table memory 4, inquiring another network per call, that is, the charging unit price database of a network for charging the communication fee (hereinafter referred to as charging network), the charging unit price is determined according to the supplied charging unit price. This corresponds to a case where the network of itself, that is, the network for informing the charging unit price (hereinafter referred to as informing network) is not a charging network.

Since actual determination method of charging unit price depends also on the structure of the called party number, it will be described later in detail.

The table memory 4 stores the calling locations, receiving locations, and if necessary, information of charging unit price specified by the relay network, as a table. In the table of the table memory 4, in addition to the case where the charging unit price data is previously formed as in the case where the network of itself (informing network) is the charging network, there is a case where the data of the charging unit price database owned by a charging network as another network, as in the case where itself is not a charging network, is previously downloaded.

The charging unit price information device 8 informs information on the charging unit price according to the charging unit price supplied from the charging unit price determination means 3 to the communication terminal 7 through the exchange main unit 1. This may be achieved by announcing the charging unit price, for example, by a voice message. For ISDN or the like, information on the charging unit price may be informed to the communication terminal 7 by an outband signal of D channel message or the like including information on the charging unit price, in which the device for controlling the outband signal of D channel control device or the like also has the function of the charging unit price information device 8.

The acknowledge unit 5, which may have a flexible structure, is for the caller receiving the charging unit price information to achieve transmission of the will as to whether or not the connection with the selected receiving side communication terminal is continued, in which a predetermined signal transmitted by a predetermined operation of the caller from the communication terminal 7 is processed to control the exchange main unit 1 to continue or cut the connection. The will in this case may be transmitted by an in-band PB signal or the like or, in ISDN, by the outband signal such as D channel message.

The relay network determination unit 6, when there are a plurality of relay networks in parallel to the receiving network, select one of them according to the caller's will. A predetermined signal transmitted from the communication terminal is processed by a predetermined operation of the caller to control the exchange main unit 1 so that the receiving side communication terminal can be connected through a predetermined relay network.

Figure 2:
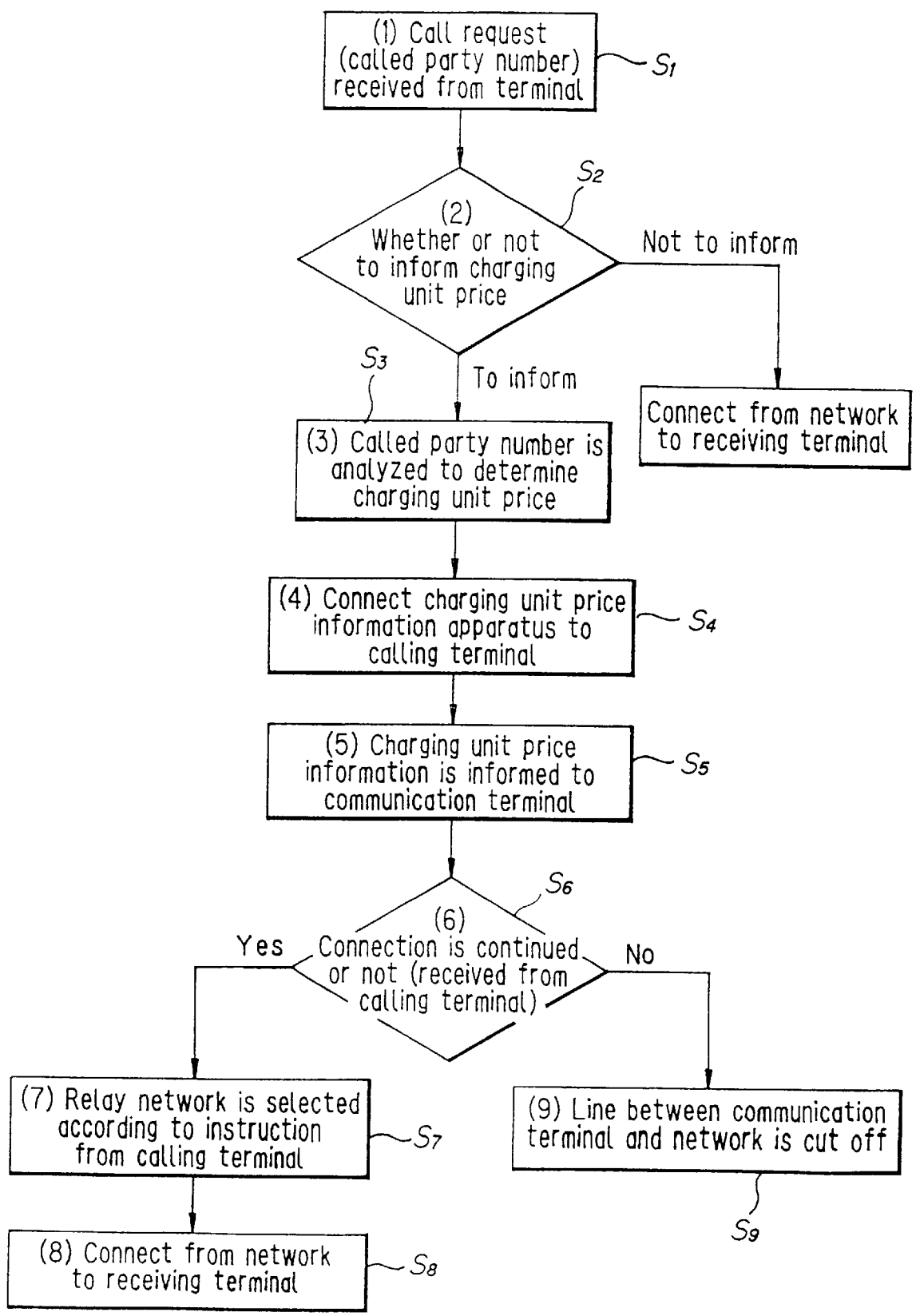
FIG. 2 is a flow chart showing the processing procedure in the apparatus shown in FIG. 1.

FIG. 2 is a flow chart showing the operation procedure at calling in the present embodiment. As shown in the Figure, when there is a call from the communication terminal 7 to a predetermined network, unit price of communication fee is informed from the network to the caller using the following procedure.

(1) The exchange main unit 1 receives a call request from the calling side communication terminal 7 (step S1).

(2) A determination is made as to whether or not the exchange main unit 1 informs the charging unit price to the caller (step S2). As a result, when not to inform, the exchange work as in the past is performed to connect from the network to the communication terminal at the receiving side.

(3) When the charging unit price is informed, the charging unit price is determined by the charging unit price determination unit 3 according to the content of the called party number analyzed by the called party number analysis unit 2 (step S3).

(4) The charging unit price information device 8 is connected to the communication terminal 7 (step S4). This is achieved, for example, by connecting the charging unit price information device 8 to one of the trunks of the exchange main unit 1, and controlling the exchange main unit 1 to connect a trunk connected with the communication terminal 7 and a trunk connected with the charging unit price information device 8. At this moment, when in ISDN or the like, the charging unit price is informed by an outband signal such as D channel message, it is not required to connect the communication line to the charging unit price information device 8.

(5) Charging unit price information is informed to the communication terminal 7 (step S5). In this case, information on the charging unit price includes the following. Communication fee per unit time (all or typical part of it when the unit price varies with passage of time) or communication fee to typical communication time (a single or a plurality of types).

(6) Whether or not connection is continued is informed from the communication terminal 7 to the network (step S6). In this case, signal supplied from the communication terminal 7 to the exchange main unit 1 is processed by the acknowledge unit 5.

(7) When the will to continue connection is confirmed in the acknowledge unit 5, as necessary, a relay network is selected by the control of the exchange main unit 1 of the relay network determination unit 6 according to the signal which the caller supplies from the communication terminal 7 to the relay network determination unit 6 through the exchange main unit 1 (step S7).

(8) When after the selection of relay network or when relay network is not selected, the will "to continue connection" is confirmed, connection is made from the network to the communication terminal at the receiving side, and finally the communication line between the communication terminal 7 at the calling side and the communication terminal at the receiving side is connected (step S8).

(9) On the other hand, when there is no will (to continue connection), the communication line to the communication terminal at the receiving side is disconnected (step S9).

Of the above procedures, step S3 and step S4 may be reversed.

<Determination of charging unit price>

Next, determination method of charging unit price as processing in step S3 will be described.

FIG. 3 shows classification of communication paths by network types from the calling side communication terminal 7 specified by analyzing the called party number to the receiving side communication terminal. As shown in the Figure, communication paths are divided into 8 types.

Further, concepts of communication system in the individual cases are shown in FIG. 4, FIG. 5, FIG. 6, FIG. 7, FIG. 8, FIG. 9, FIG. 10, and FIG. 11. In these Figures, II is an informing network for informing the charging unit price, III is a mobile communication network, IV is a charging network for charging in communication, 9 is a communication terminal at the receiving side, 10 is a mobile terminal location database, and 11 is a charging unit price information database. Of these, the mobile terminal location database is in the mobile communication network III and stores the location of the mobile terminal 9. Still further, the charging unit price information database is in the charging network IV and stores charging unit price information for charging.

Tables for the cases classified according to FIG. 3 are individually shown in FIG. 12, FIG. 13, FIG. 14, FIG. 15, and FIG. 16.

Charging unit price determination method for each of the 8 cases classified in FIG. 3 will be described in detail.

A. When lines are connected by a single network

Determination of charging unit price depends on whether the network connecting the communication lines is a fixed communication network or a mobile communication network. Charging unit price is determined from the called party number for the case of fixed communication network, whereas charging unit price is not always unitarily determined from the called party number in the mobile communication network, and charging unit price may depend on the location of the receiving side communication terminal.

(A-1) When charging unit price is unitarily determined from called party number

Figure 4:
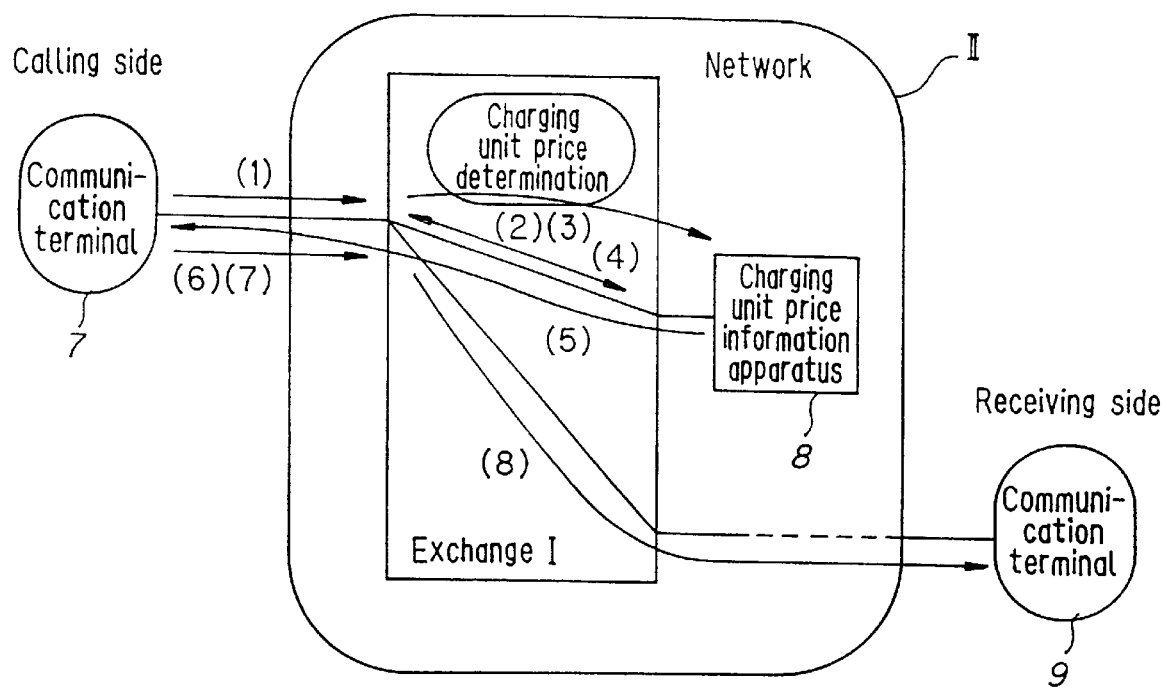
FIG. 4 is a diagram for explaining a first communication system according to an embodiment of the present invention.

Communication system in this case is shown in FIG. 4. In the Figure, parts similar to those used in FIG. 1 have similar reference numerals, and flow of signals corresponding to individual steps S1 to S8 in FIG. 2 are indicated as (1), (2), (3), (4), (5), (6), (7), and (8) according to the suffix of the step number (this is also the same in FIG. 5 to FIG. 11).

The present example (A-1) is the case where the table memory 4 of the device shown in FIG. 1 stores the table shown in FIG. 12. Further, the present example is the case where the informing network II is a charging network.

When the receiving location is unitarily determined from the called party number informed from the calling side communication terminal 7 to the informing network II as in the case where the informing network II is a fixed communication network, the charging unit price can be determined only by this condition. That is, since the informing network II is also a charging network, a table to which the charging unit price can be referred from the calling location and the receiving location (and communication time zone) is provided in the informing network II, and the table may be referred to when the receiving location is fixed at calling to determine the charging unit price.

For example, when a single fixed communication network in the domestic communication, the receiving location identification code (048) and the receiving destination subscriber's number (654 3210) are informed to the network II at calling as the called party number 048 654 3210, since the network II can detect the calling location, a table showing correspondence between the receiving location identification code and the charging unit price for every calling location is previously provided as shown in FIG. 12, the called party number is analyzed, and the charging unit price corresponding to the receiving location identification code (048) can be determined by referring to the table as 35 sec/10 yen.

When the charging unit price varies depending on the communication time, a table according to the communication time can be used. Further, when the charging unit price varies with the length of talk time, all charging unit prices according to the length of talk time can be provided on the table.

(A-2) When charging unit price depends on the location of the receiving side communication terminal 9

Figure 5:
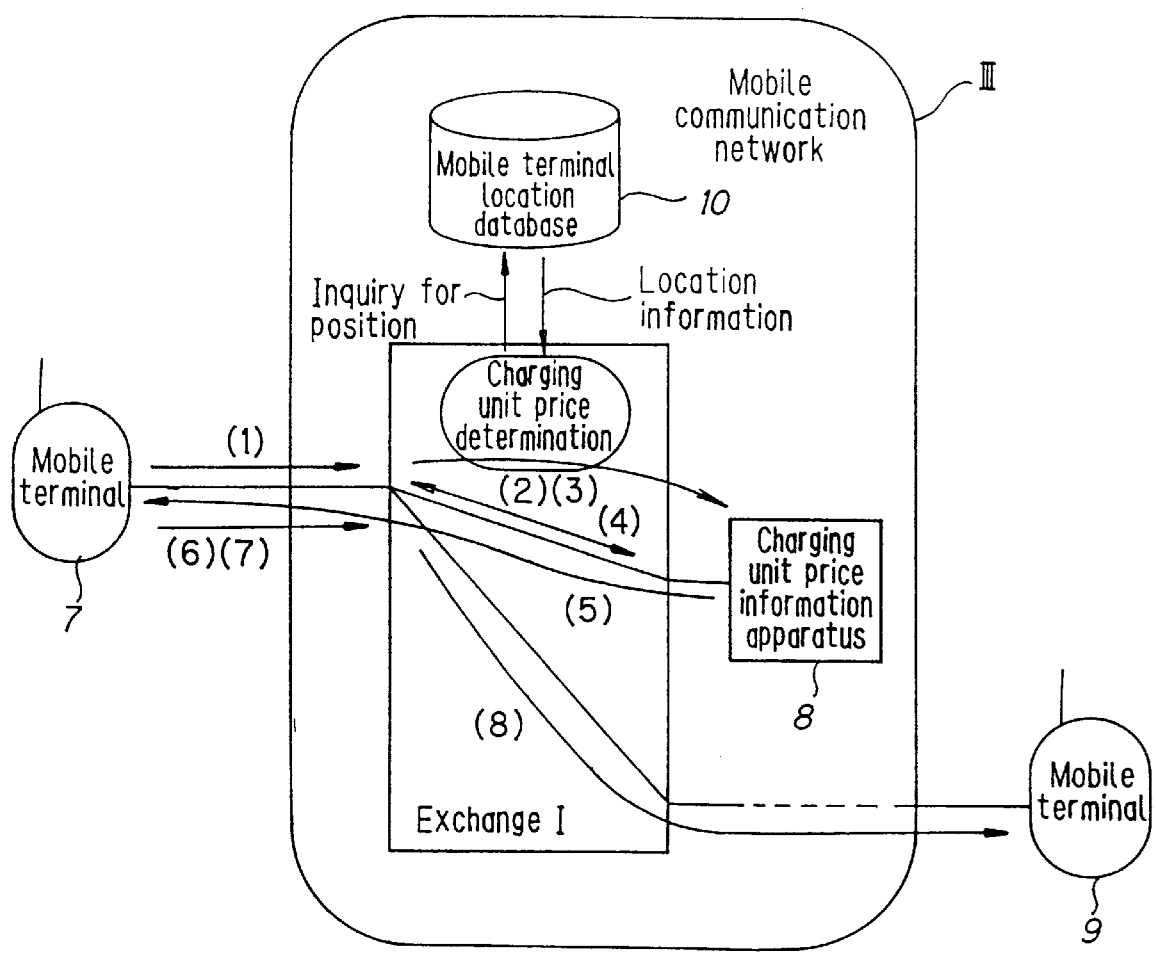
FIG. 5 is a diagram for explaining a second communication system according to an embodiment of the present invention.

The communication system in this case is as shown in FIG. 5. In the present example (limited for area undesignating system), the table memory 4 shown in FIG. 1 stores the table shown in FIG. 13, the mobile communication network III as the informing network also functions as the charging network, therefore the charging unit price determination unit 3 inquires the mobile terminal location database 10 of the location, and the communication terminal 9 at the receiving side as the mobile terminal can be specified.

In the mobile communication network III or the like, when the communication terminal 9 at the receiving destination is a mobile terminal or the like and the charging unit price varies with the location, since the receiving area can be known from the called party number informed at calling when calling in the area designating system, the charging unit price can be determined by the same method as (A-1).

When the receiving destination communication terminal 9 is a mobile terminal or the like and the charging unit price varies with the location, and when calling in the area undesignating system, reference is made to the mobile terminal location database 10 storing the location of the communication terminal 9 as the mobile terminal to know the location of the communication terminal 9, and the charging unit price can be determined from the information. That is, a table which the charging unit price can be referred to from the calling location and the receiving location (and communication time zone) is provided in the network III, and the charging unit price may be determined by referring to the table when the receiving location is fixed at calling.

For example, when calling a mobile terminal in the mobile communication network III, the mobile communication network access code (030), the mobile communication enterprise identification code (12) and the mobile terminal subscriber number (34567) are informed to the network III, as the called party number 030 12 34567, when it is to a terminal within the network of itself, the network III detects the mobile communication network access code (030) and the mobile communication enterprise identification code (12) to know that the receiving destination is the communication terminal 9 in the network of itself. Further, the network III can refer to the mobile terminal location database 10 registering the location for the location of the mobile terminal 9 which is the mobile terminal of the mobile terminal subscriber number (34567).

Then, as shown in FIG. 13, a table showing correspondence between the receiving location and the charging unit price for every calling location is previously provided, on receiving the location of the communication terminal 9 in response to the inquiry, the table can be referred to determine the charging unit price. For example, when calling from Tokyo, when it is informed that the location of the communication terminal 9 is Saitama Prefecture, the charging unit price can be determined as 30 sec/10 yen.

Also when using a personal number as in personal communication, since the terminal to receive varies with the location of the receiver, the charging unit price can be determined by the same method as in the mobile terminal.

B. When the line is connected through a plurality of networks and the charging network informs the charging unit price When the communication line is connected through a plurality of networks such as local network (calling side, receiving side), relay network, mobile communication network and the like, normally the charging is made by one of the routing network. In this case, the method for determining the charging network differs depending on whether the charging network informs the charging unit price or a network other than the charging network informs the charging unit price.

When the charging network informs the charging unit price, since the charging network has the charging unit price information necessary for charging, the charging unit price can be informed utilizing the information.

At this time, determination of the charging unit price depends on whether the charging unit price is unitarily fixed from the called party number, or a plurality of charging unit prices are considered depending on the relay network, or the charging unit price depends on the location of the receiving terminal.

Figure 17:
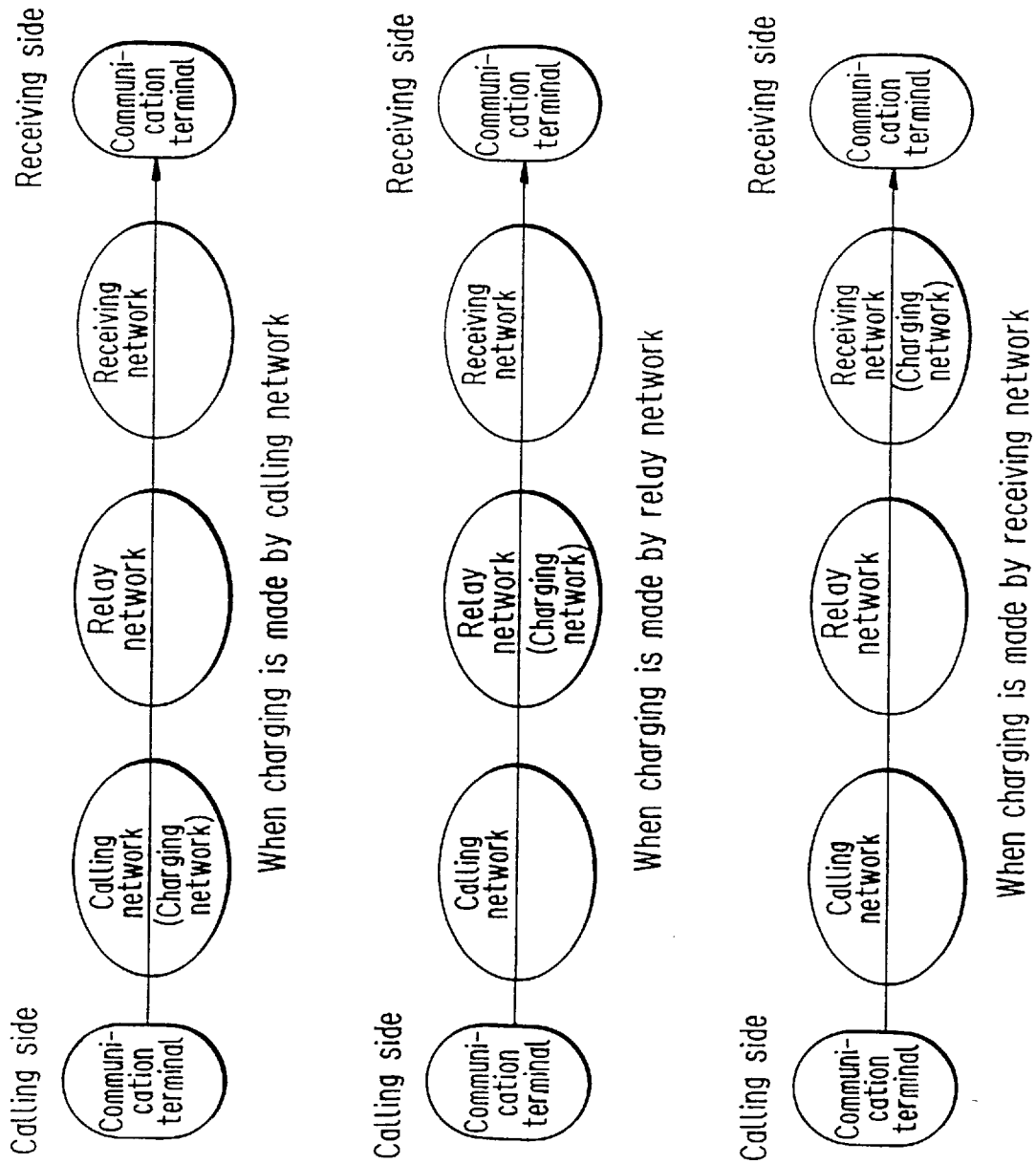
FIG. 17 is a diagram for explaining a charging network in a communication path having a relay network.

(B-1) When the charging unit price is unitarily determined from the called party number The charging unit price is unitarily determined from the called party number normally when the receiving destination is a fixed terminal. As a typical example, as shown in FIG. 17, the line is connected through the calling network (calling side fixed communication network or calling side mobile communication network), and one of the networks makes charging. At this time, since the relay network and the receiving location are unitarily determined from the called party number informed from the calling side communication terminal to the informing network II (including a case where the relay network is tacitly designated), the charging unit price can be determined only by the information on the called party number and the calling location when charging is made by either network. That is, a table that can refer to the charging unit price from the calling location, relay network, and receiving location (and communication time zone) is provided in the communication network II as the charging network, and the charging unit price may be determined by referring to the table when the relay network and the receiving location are fixed at calling.

For example, in domestic communication, when domestic relay network identification code (0088), receiving location identification code (048) and receiving destination subscriber number (654 3210) are informed at calling as the called party number 0088 048 654 3210, as shown in FIG. 14, a table showing correspondence between the domestic relay network identification code, the receiving location identification code, and the charging unit price for every calling location is previously provided in the charging network.

The informing network II as the charging network can obtain information on the calling location by any method at calling. That is, when the calling network makes charging, since it is connected directly to the calling side communication terminal 7, the caller number or the subscriber interface identification number used by the caller or the like can be obtained as information on the calling location. When a network other than the calling network makes charging, that is, when the relay network or the receiving network make charging, information on the calling location or the calling location itself may be informed from the calling network. Further, when the relay network makes charging, the calling location may be identified from the identification number of the connection interface of the calling network and the relay network.

From the thus obtained information on the calling location and the result of called party number analysis, by referring to the table shown in FIG. 14, the charging unit price corresponding to the domestic relay network identification code (0088) and the receiving location identification code (048) can be determined as 48 sec/10 yen. Even when only the receiving location identification code (048) and the receiving destination subscriber number (654 3210) are informed to the network at calling, if the relay network is tacitly determined to one, the charging unit price can be determined using the same procedure.

Further, in international communication, for example, when international relay network identification code (001), country code (82), and domestic number (2 765 4321) of the receiving destination are informed to the network, as the called party number 001 82 2 765 4321, as shown in FIG. 15, the international relay network identification code, a table showing correspondence between the country code (and if necessary, receiving location identification code or part thereof of the individual nation) and the charging unit price is previously provided, by referring to the table after the analysis of the called party number, the charging unit price corresponding to the international relay network identification code (001) and the national number (82) can be determined as 15 yen/6 sec. Since, normally in international communication, the charge does not depend on the caller's location, that is, at present, the same charging unit price is applied when calling from any place in Japan, it is not always necessary to know information on the calling location in order to determine the charging unit price.

When the relay network makes charging and informs the charging unit price, since which relay network was selected is obvious, a table showing only correspondence between the receiving location identification code or the country code and the charging unit price may be used.

When the charging unit price varies with the communication time, a table according to the communication time may be used. Further, when the charging unit price varies with the length of talk time, all the charging unit prices according to the length of talk time can be provided in the table.

The communication system in this case is as shown in FIG. 4, in which the informing network is either the calling network, relay network or the receiving network, or in a case where the table memory 4 of the device of FIG. 1 stores the table shown in FIG. 14 or FIG. 15.

Figure 18:
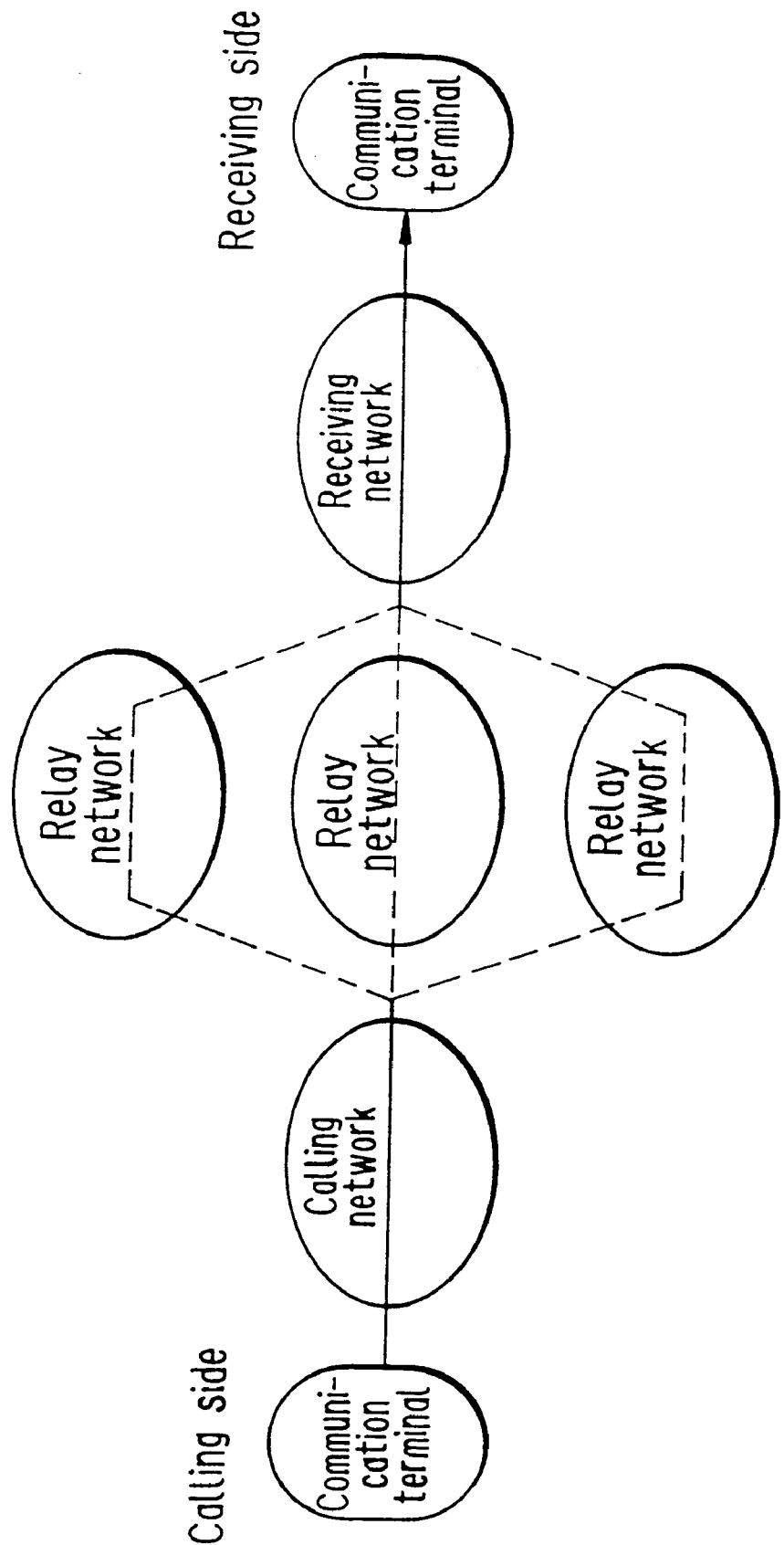
FIG. 18 is a diagram schematically showing a communication path when a plurality of relay networks exist in parallel.

(B-2) A plurality of charging unit prices are considered depending on the relay network When charging is made at the calling network when the communication line is connected through the calling network (calling side fixed communication network or calling side mobile communication network), the relay network and the receiving network (receiving side fixed communication network), only the receiving location is unitarily determined by the number informed from the calling side communication terminal 7 to the network, and, as the relay network, as shown in FIG. 18, a plurality of candidates can be considered. In such a case, the charging unit price may also be determined for every relay work.

At this time, since the calling network as the charging network informs the charging unit price as the informing network II, that is, since the charging network is not the relay network or the receiving network (in either of these cases, same as (B-1)), a table that can refer to the charging unit price from the calling location, relay network, and receiving location (and talk time zone) is provided in the calling network, and the charging unit price may be determined for every candidate relay network by referring to the table when receiving location is fixed by the analysis of the called party number.

For example, as in the above example, when only the receiving location identification code (048) and the receiving destination subscriber number (654 3210) are informed to the network at calling, and when there are a number of candidates as the relay network, the table as shown in FIG. 14 may be referred to for every candidate relay network to determine the charging unit price. That is, in this case, for 0070 relay network, the charging unit price can be determined as 40 sec/10 yen, and for 0077 relay network, the charging unit price can be determined as 48 sec/10 yen.

Further, in international communication, when international network access code (0XY), country code (82), and domestic number of the receiving destination (2 765 4321) are informed at calling, as a called party number

0XY 82 2 765 4321, and there are a number of candidates as international relay network, the charging unit price may be determined at the calling network by referring to the table as shown in FIG. 15 for every relay network as each candidate. That is, in this case, the charging unit price can be determined as 15 yen/6 sec for 001 relay network, 16 yen/6 sec for 0041 relay network, and 16 yen/6 sec for 0061 relay network.

The communication system in this case is as shown in FIG. 4, and when the table memory 4 of the device shown in FIG. 1 stores the table shown in FIG. 14 or FIG. 15, and when the caller can select one of the plurality of relay networks by the relay network determination unit 6.

(B-3) When the charging unit price depends on the location of the receiving side communication terminal 9

Figure 6:
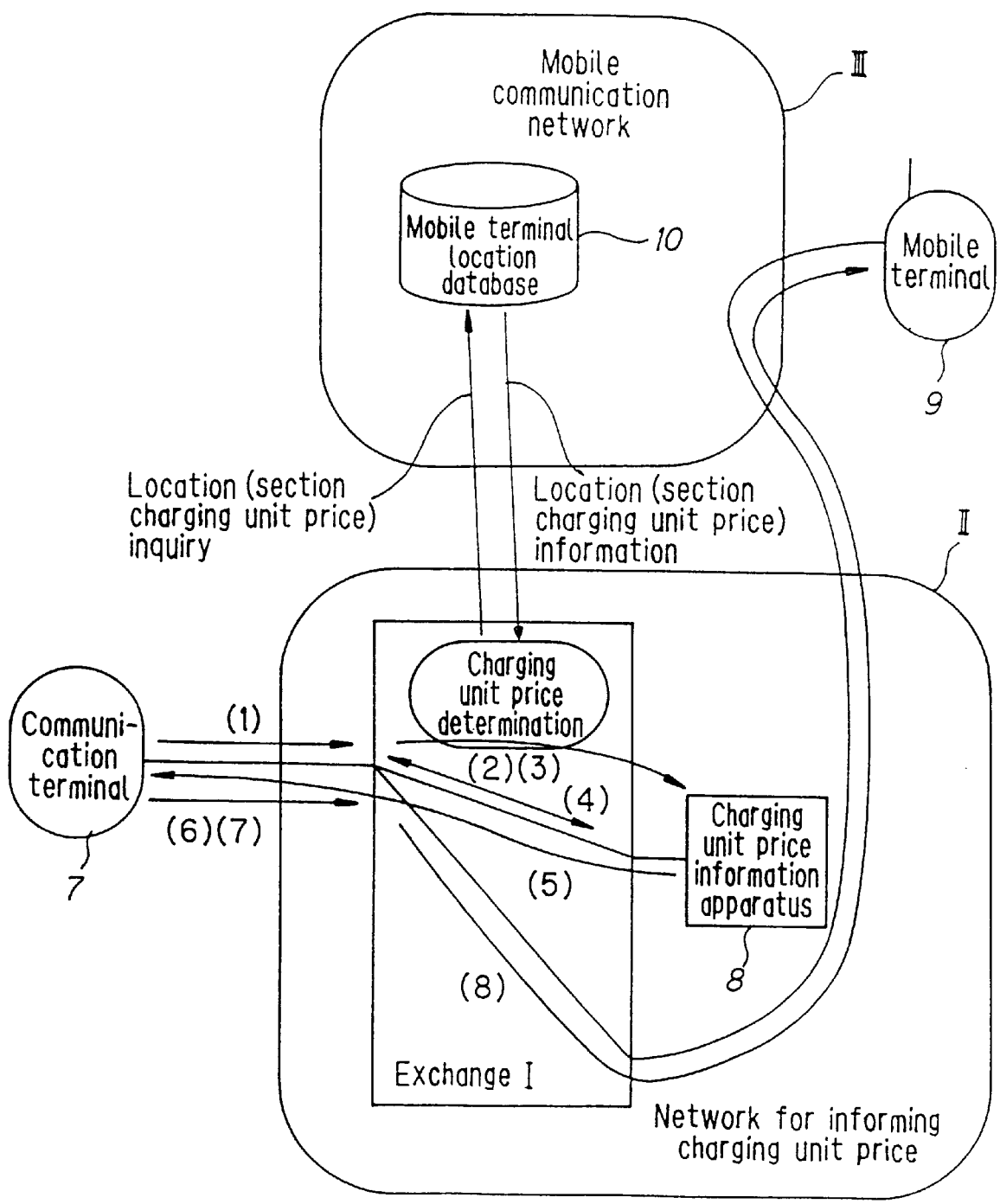
FIG. 6 is a diagram for explaining a third communication system according to an embodiment of the present invention.

The communication system in this case is as shown in FIG. 6. The present example (limited to area undesignating system) corresponds to a case where the table memory 4 of the device shown in FIG. 1 stores, for example, the table shown in FIG. 16, and the informing network II as the charging network and the mobile communication network III are different networks. Therefore, the charging unit price determination unit 3 can inquire the mobile terminal location database 10 in the mobile communication network III as another network of the location to specify the location of the receiving side communication terminal 9 as a mobile terminal.

In the present example, since the informing network II is the charging network, and charging information of a network other than the mobile communication network III can be specified by the informing network II, section unit price in the mobile communication network 10 according to the location of the communication terminal 9 may be supplied from the mobile terminal location database. Inquiry for the section unit price and reception of the notice at this time are performed by the charging unit price determination means 3 of the device shown in FIG. 1, and table information in the table memory 4 is unnecessary.

When the charging unit price varies depending on the location such as because the receiving communication terminal 9 is a mobile terminal, and when calling in the area designating system, since the receiving area is known from the called party number informed at calling, the charging unit price can be determined by the same method as (B-1).

When the charging unit price varies depending on the location such as because the receiving communication terminal 9 is a mobile terminal, calling in the area undesignating system, and charging is made by the informing network II other than the mobile communication network III as the receiving network (when the mobile communication network III is the informing network II, the communication system is as shown in FIG. 5), reference is made to the mobile terminal location database storing the location in the mobile communication network III for the location of the receiving side communication terminal 9 or section unit price determined by the location, and the charging unit price can be determined according to the information. That is, a table that can be referred to the charging unit price from the calling location and the receiving location (and talk time zone) is provided in the informing network (charging network) IV, and the charging unit price may be determined by referring to the table when the receiving location is fixed at calling. Or, when section unit price is informed from the mobile terminal location database 10, the section unit price may be converted to the charging unit price charged to the caller.

For example, when calling a mobile terminal, mobile communication network access code (030), mobile communication enterprise identification code (12), and mobile terminal subscriber number (34567) are informed to the network as the called party number 030 12 34567, the charging network detects the mobile communication network access code (030) to know that the receiving destination is a mobile terminal. Further, since the mobile communication enterprise identification code (12) is considered to indicate the enterprise or the location of the mobile terminal location database 10 registering the location of the communication terminal 9, the informing network II can refer to the enterprise or mobile terminal location database 10 for the location of the communication terminal as the mobile terminal of the mobile terminal subscriber number (34567) or the section charging unit price.

When the location of the communication terminal is informed to the inquiry, a table showing correspondence between the receiving location and the charging unit price for every calling location is previously provided as shown in FIG. 16, and the charging unit price may be determined by referring to the table. For example, when calling from Tokyo, when it is informed that the location of the communication terminal 9 is Saitama Prefecture, the charging unit price can be determined as 25 sec/10 yen.

When the section unit price is informed to the inquiry, the informed section unit price may be converted to the charging unit price. This can be converted by providing a function. As an achieving method of the function at this time, a conversion table may be referred.

When calling in area undesignating system, and charging is made by the mobile communication network III as the receiving network, in the same method as (A-2), the charging unit price can be determined in the mobile communication network III and informed. However, when it is necessary to specify the calling location for charging unit price determination, information on the calling location must be informed from the calling network or the like, but the calling location information is necessary for charging, it may be considered that calling location information may be informed from the calling network or the like with no problem whether or not the charging unit price is informed.

Also when using a personal number as in personal communication, since the receiving terminal varies with the location of the receiver, the charging unit price can be determined by the same method as in the case of mobile terminal.

C. When line is connected through a plurality of networks and the charging unit price is informed by a network other than charging network For a network other than the charging network IV to inform the charging unit price, it is necessary that information on the charging unit price is previously downloaded from the charging network IV or the like, or reference is made to the charging network IV per every call.

At this time, the method for determining the charging unit price differs depending on cases that the charging unit price is unitarily determined from the called party number, there are different charging unit prices depending on the relay network, or the charging unit price depends on the location of the receiving terminal.

Figure 7:
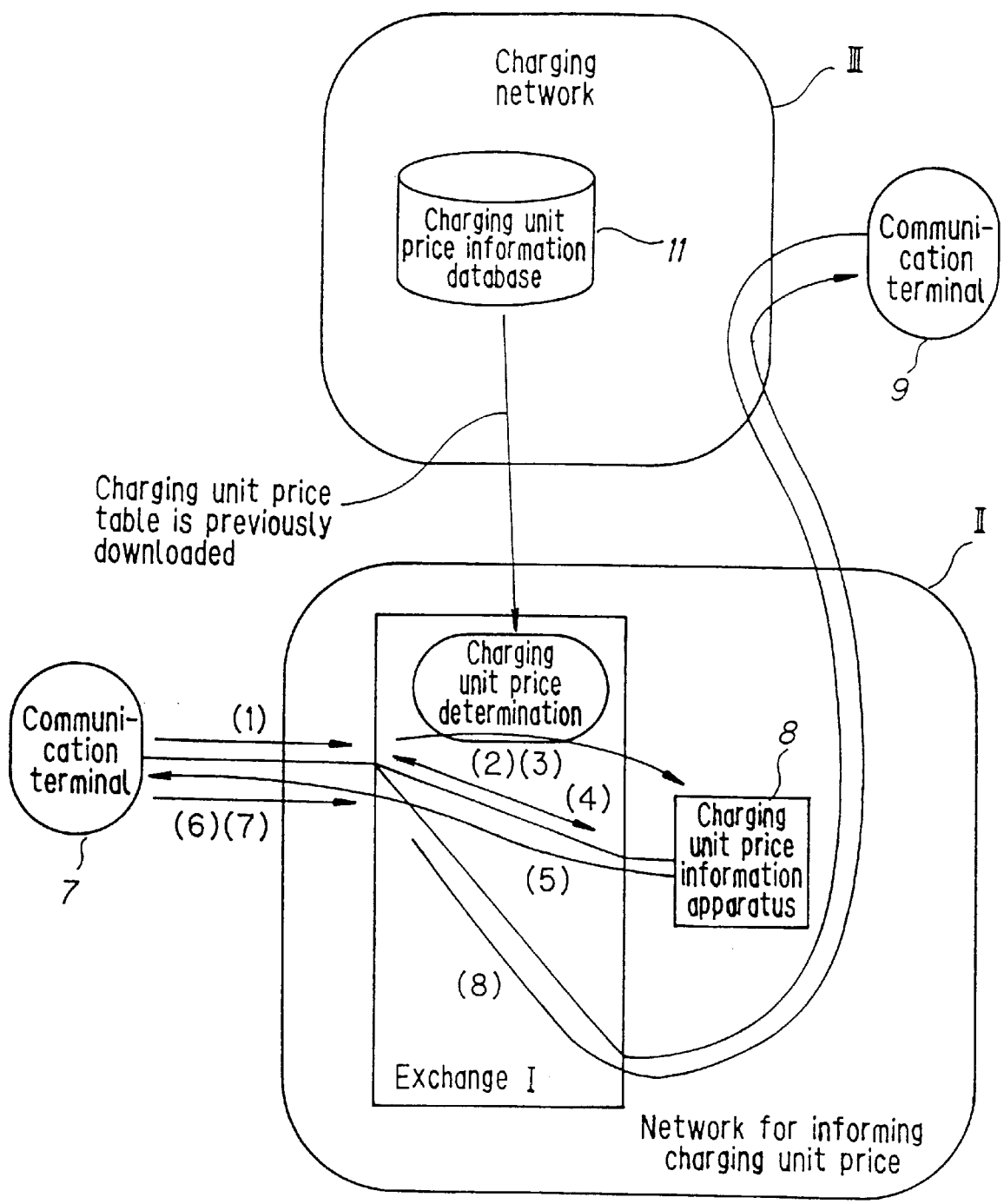
FIG. 7 is a diagram for explaining a fourth communication system according to an embodiment of the present invention.
Figure 8:
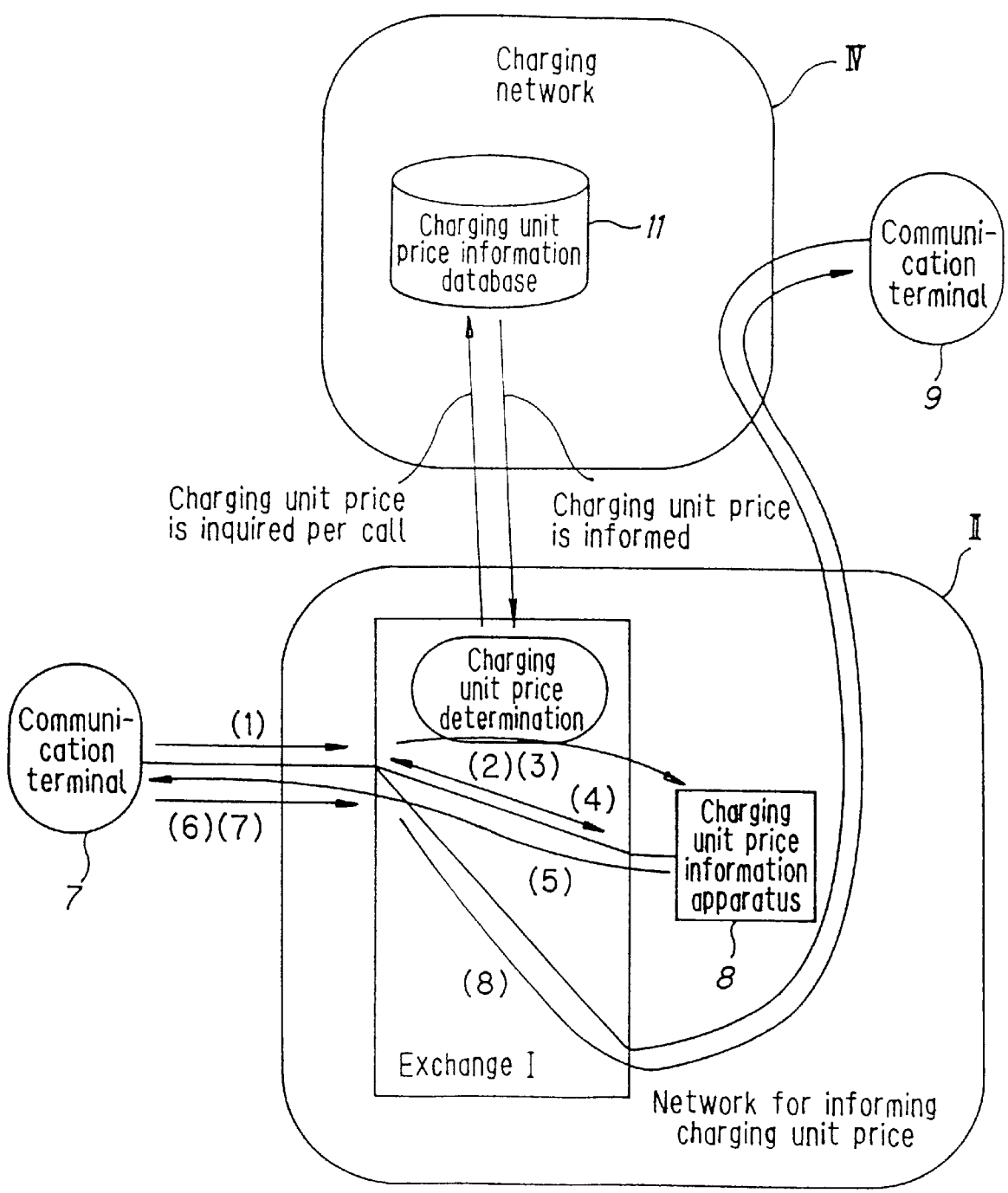
FIG. 8 is a diagram for explaining a fifth communication system according to an embodiment of the present invention.

(C-1) When the charging unit price is unitarily determined from the called party number The communication system in this case is as shown in FIG. 7 or FIG. 8. In the communication system shown in FIG. 7, when charging is made by the charging network IV different from the informing network II, the table memory 4 of the device shown in FIG. 1 is previously downloaded with the contents of the charging unit price information database 11 of the charging network IV to prepare the table shown in FIG. 12, which is stored.

On the other hand, the communication system shown in FIG. 8 is for the case where the charging unit price information database 11 of the charging network IV is referred per every call. That is, this is the case where the charging unit price information database 11 functionally corresponds to the table memory 4 of the device shown in FIG. 1. Therefore, in this case, the table memory 4 is unnecessary.

As a method in which a network other than the charging network IV determines the charging unit price when the relay network and receiving location are unitarily determined (including a case where the relay network is tacitly designated) from the number informed from the calling side communication terminal 7 to the network, a table that can be referred to for the charging unit price from the calling location, relay network, and receiving location (and communication time zone) is previously downloaded from the charging network IV, and the charging unit price may be determined by referring to the table when the relay network and receiving location are fixed at calling. In this case, the charging unit price can be determined by the same method as (B-1).

As another method, as shown in FIG. 8, a method is considered in which the charging network IV is referred to from the informing network II informing the charging unit price for the charging unit price per every call. In this case, the charging network IV received the inquiry may determine the charging unit price by the same method as in (B-1).
(C-2) When a plurality of charging unit prices are considered depending on the relay network In this case, a plurality of relay networks other than the informing network II as the calling network are individual charging networks IV, therefore the communication system is the same as in (C-1) except that there are a plurality of relay networks as the charging networks IV, and basically has the same arrangement as that shown in FIG. 7 or FIG. 8. Further, also in this case, the caller can select one of the plurality of relay networks by the relay network determination unit 6 as in the case of (B-2).

In the present example, the communication line is connected through a plurality of networks, only the called party number is unitarily determined by the number informed by the calling side communication terminal 7 to the network, when there are a plurality of candidates as the relay network, the charging unit price may also be determined for each relay network. At this time, when each relay network makes charging, and the calling network which is not the charging network IV makes charging unit price information as the informing network II, the calling network is previously downloaded with the table that can be referred to for the charging unit price from the calling location, relay network, and receiving location (and talk time zone) from the charging unit price information database 11 of the individual relay network (=charging network IV), and the charging unit price may be determined for every relay network as the candidate by referring to the table when the receiving location is fixed by the analysis of the called party number. In this case, the charging unit price can be determined by the same method as in (B-2).

Further, a method can also be considered in which the charging unit price is determined by referring to the individual relay network (=charging network IV) for the charging unit price from the informing network II as the calling network which is not the charging network, and in this case the relay network which is referred to may determined the charging unit price by the same method as in (B-1).
(C-3) When the charging unit price varies with the location of receiving terminal The communication system in this case is one of those shown in FIG. 9, FIG. 10, and FIG. 11.

Figure 9:
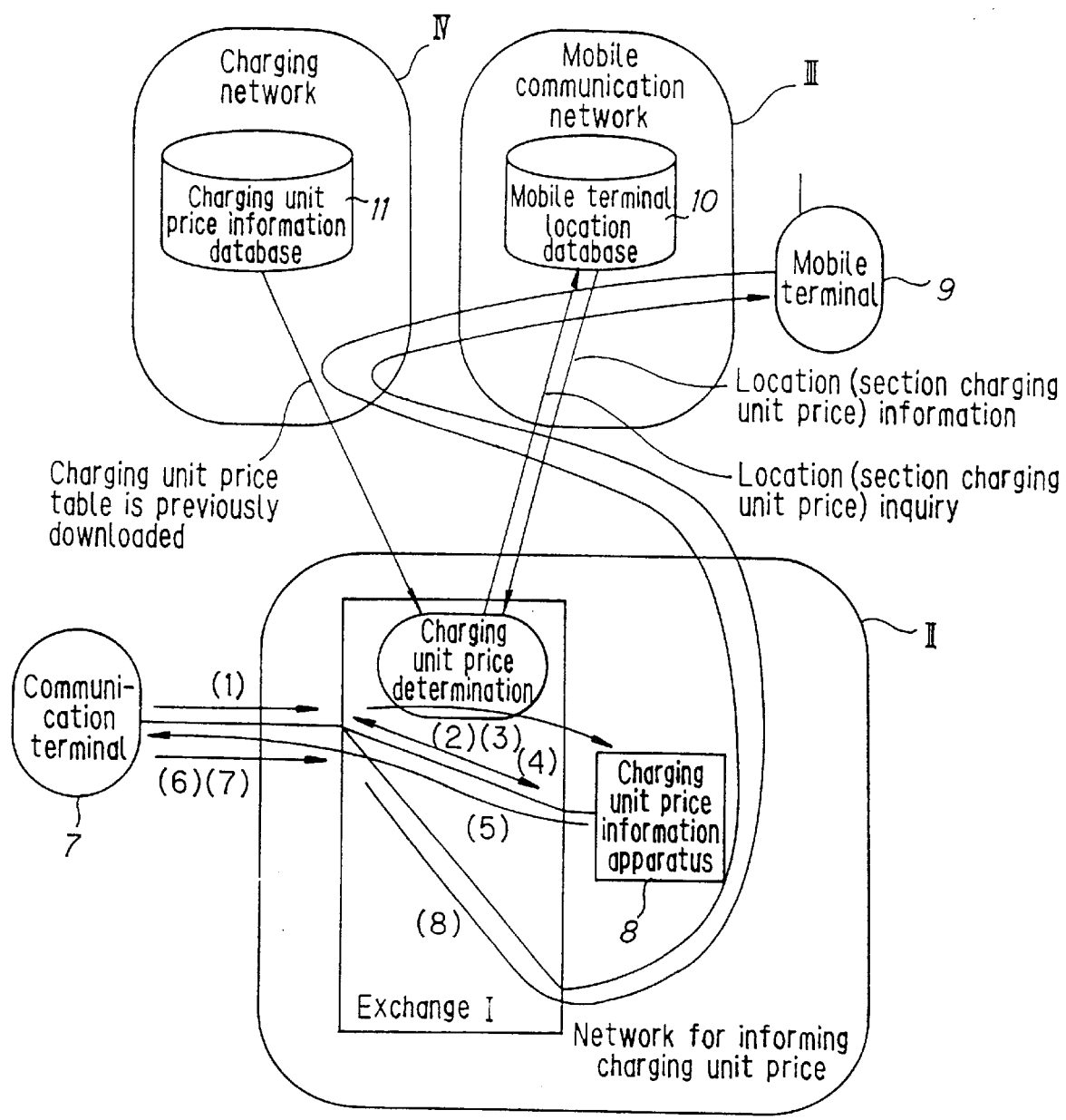
FIG. 9 is a diagram for explaining a sixth communication system according to an embodiment of the present invention.

The communication system shown in FIG. 9 is for the case where the informing network II as the calling network, the mobile communication network III as the receiving network, and the charging network IV as the relay network differ from each other, in which the informing network II is previously downloaded and stored with the charging unit price information from the charging unit price information database owned by the charging network IV for charging, the mobile communication network III refers to the mobile terminal location database storing the location of the communication terminal 9 as the mobile terminal of itself for the location of the communication terminal 9 or the section unit price, and the charging unit price is determined according to the information on the informed information on the location or section unit price.

That is, in the present example, the table memory 4 of the device shown in FIG. 1 is previously downloaded with the contents of the charging unit price information database 11, the charging unit price determination unit 3 communicates with the mobile terminal database 10, and the charging unit price determination unit 3 refers to the table memory 4 according to the location of the communication terminal 9 as the mobile terminal to determine the charging unit price.

Figure 10:
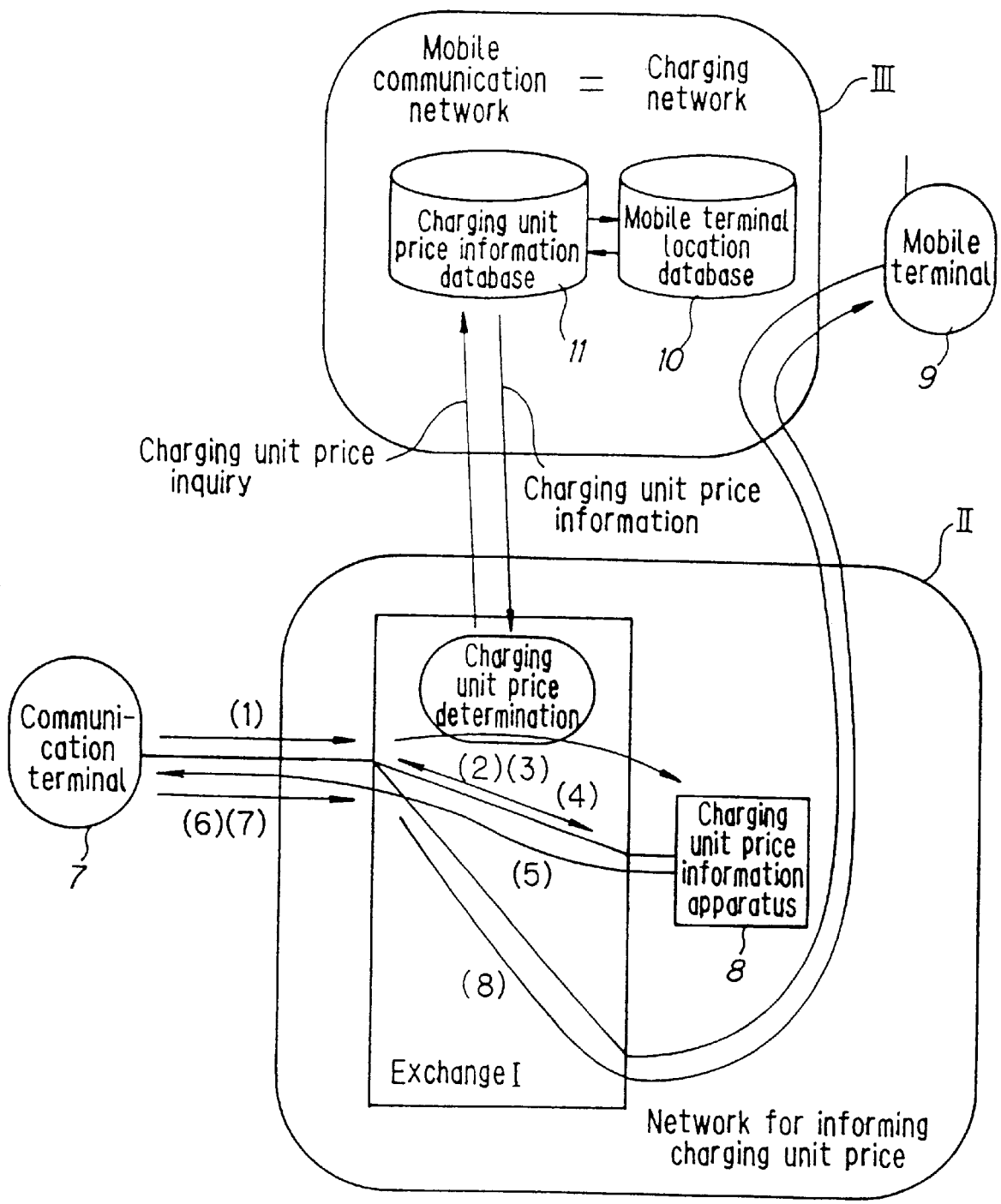
FIG. 10 is a diagram for explaining a seventh communication system according to an embodiment of the present invention.

The communication system shown in FIG. 10 is for the case where the mobile communication network III as the receiving network is also the charging network. In the present example, since the charging unit price information database 11 grips the charging unit price using the location of the communication terminal 9 as parameters by communicating with the mobile terminal location database 10, the informing network II as the calling network may refer to the charging unit price information database 11 for the charging unit price. Therefore, in the present example, the table memory 4 of the device shown in FIG. 1 is unnecessary, and the charging unit price determination unit 3 determines the charging unit price by communicating with the charging unit price information database 11.

Figure 11:
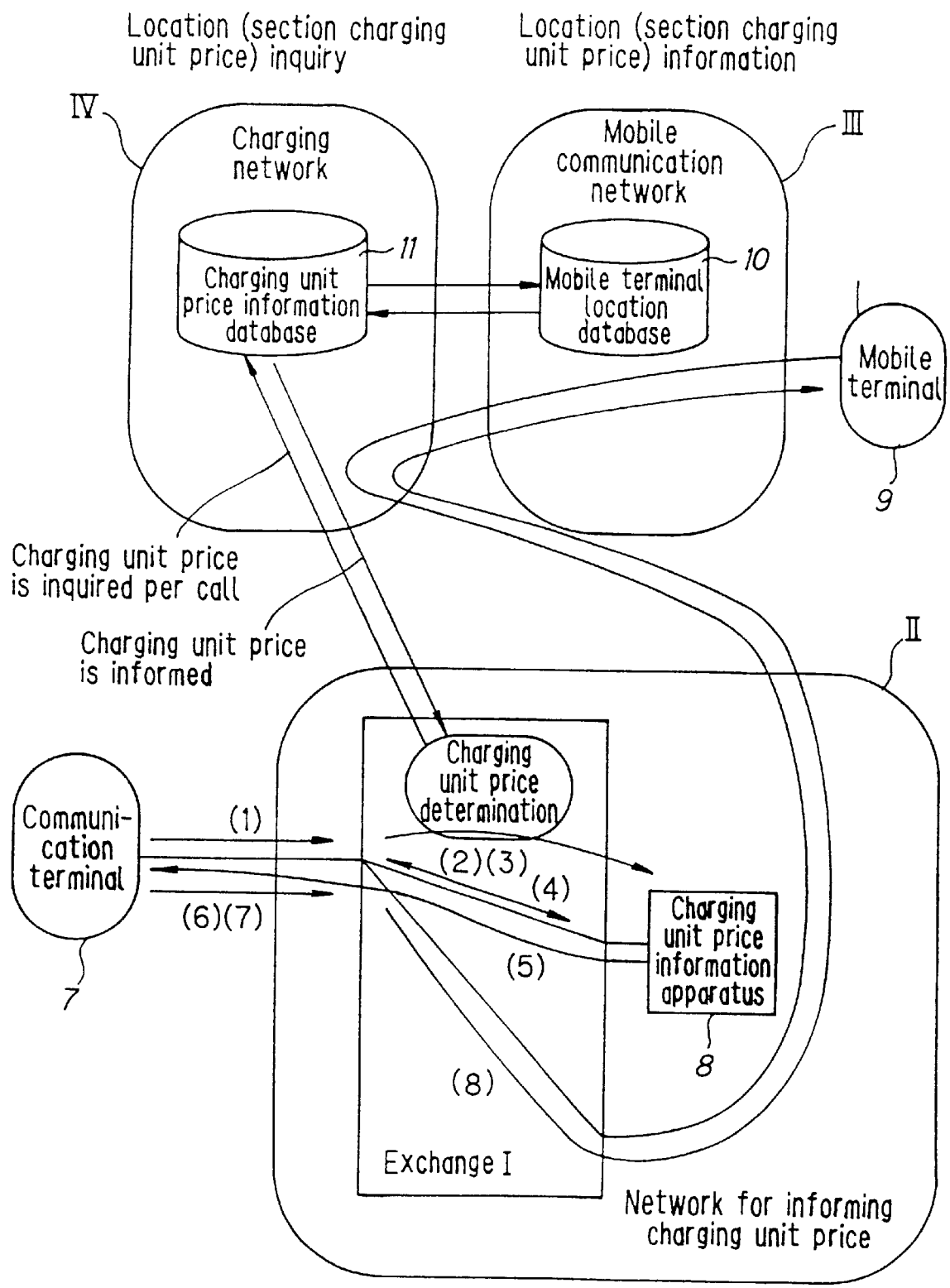
FIG. 11 is a diagram for explaining an eighth communication system according to an embodiment of the present invention.

The communication system shown in FIG. 11 is for the case where the charging network IV as the relay network having the charging unit price information database 11 and the mobile communication network III as the receiving network having the mobile terminal location database 10 are divided as independent networks. Therefore, other parts may be the same as those in the communication system shown in FIG. 10.

When the receiving destination is a mobile terminal or the like and the charging unit price varies with the location and calling in the area designating system, since the receiving area can be known from the called party number informed at calling, the charging unit price can be determined by the same method as in (B-1) by previously downloading the table that can be referred to for the charging unit price from the receiving area from the charging network. Further, it can also be considered that the charging unit price is determined by referring to the charging network per every call and, in this case, the charging network received the inquiry may determine the charging unit price by the same method as in (B-1).

When the receiving destination is a mobile terminal or the like and the charging unit price varies with the location and calling in the area undesignating system, reference is made to the mobile terminal location database 10 registering the location for the location of the receiving terminal or the section charging unit price determined by the location, and the charging unit price can be determined according to the information.

That is, as shown in FIG. 9, the network for informing the charging unit price is previously downloaded from the charging network IV with a table that can be referred to for the charging unit price from the calling location and the location of the receiving terminal (and communication time zone), and the charging unit price may be determined by referring to the table when the location of the receiving terminal is determined by referring to the mobile terminal location database of the mobile communication network III at calling. Or, when the section charging unit price is informed from the database, it may be converted to the charging unit price charged to the caller. In practice, the charging unit price can be determined by the same method as in (B-3). In FIG. 9, the charging network IV and the mobile communication network III are different networks, but the same method can be used when the networks are same.

Further, the informing network II for informing the charging unit price may refer to the charging network IV for the charging unit price per every call. When charging is made by the mobile communication network III, since the charging unit price can be determined by the mobile communication network III as shown in FIG. 10, it may be informed.

On the other hand, when the charging network IV and the mobile communication network III are different, as shown in FIG. 11, the charging network IV further refers to the mobile communication network III for the location of the receiving side communication terminal 9 or the section charging unit price determined by the location, and the charging network IV determines the charging unit price from the information.

In necessary for determining the charging unit price in the charging network IV, the calling area or the calling ID is informed to the charging network IV.

In each communication system of A to C, also when a number other than for reception is input for the purpose of changing the charging destination as in credit card call, information of the charging unit price can be made by the same method as above except for a special processing such as changing the charging destination.

Further, the above charging unit price information function as shown in C above can also be provided to PBX. In this case, the PBX may perform the function of the network for the charging unit price information described above.

In the above described example, the charging network is limited to one, however, the charging unit price information is also possible for the case where networks differing for the individual sections from the calling terminal to the receiving terminal make charging. When a network is to make charging in this case, the charging unit price is determined by the method shown in A or B for a section where the network makes charging, and the charging unit prices for other sections may be determined by the method as shown in C, which are combinedly informed.

As described above in detail with reference to the embodiments, with the present invention, including the case where the receiving side communication terminal is a mobile terminal, the caller can know the charging unit price in the present communication.

Further, since the will as to whether or not the communication is continued can be transmitted by the acknowledge unit, continuation of the communication or the cut-off mode can be optionally selected after confirming the charging unit price.

Still further, any one of a plurality of parallel relay networks can be selected according to the caller's will.

Next, a second embodiment of the present invention will be described in detail with reference to the drawings.

Figure 19:
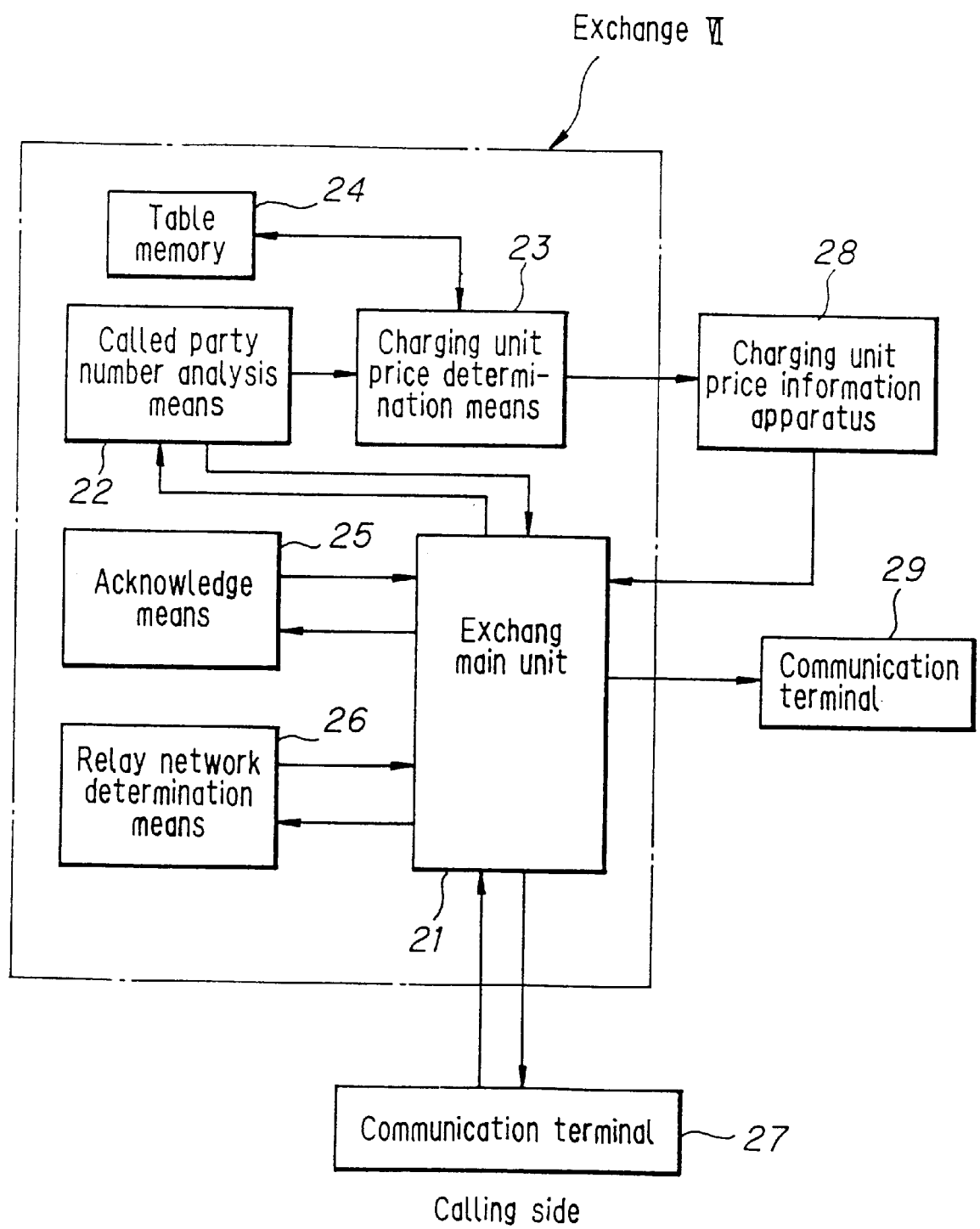
FIG. 19 is a block diagram showing basic structure of the charging unit price determination/information apparatus according to an embodiment of the present invention.

FIG. 19 is a block diagram showing a charging unit price determination/information apparatus according to the present embodiment. As shown in the Figure, the present embodiment mainly includes an exchange VI. The exchange VI includes called party number analysis unit 22, charging unit price determination unit 23, a table memory 24, acknowledge unit 25, and relay network determination unit 26, in addition to an exchange main unit 21.

The exchange main unit 21 makes exchange work as its original work, and also makes exchange of predetermined signals with other units. That is, it has functions to connect a communication terminal 27 at the calling side with a communication terminal at the receiving side, exchange signals with the called party number analysis unit 22, the acknowledge unit 25, and the relay network determination unit 26, and receive charging unit price information, which is an output signal of a charging unit price information device 28, and send it to the communication terminal 27.

The communication terminal 27 transmits a signal to the exchange main unit 21 of a predetermined communication network (hereinafter referred to as "network") to request calling. At this moment, the communication terminal 27 informs, if necessary, the international relay network identification code, country code or domestic relay network identification code, receiving network identification code, and receiving location identification code, and when the receiving destination is a mobile communication network, mobile communication network access code, and mobile communication enterprise identification as the called party number to specify the receiving destination. Further, an identification code indicating charging to the receiving side such as collect call may be added to the called party number to indicate reception of a charging unit price report. These are transmitted from the communication terminal 27 to the network as PB signal or information included in the D channel message for the case of ISDN signal.

The called party number analysis unit 22 analyzes the called party number from the communication terminal 27 transmitted through the exchange main unit 21, and sends the information to the exchange main unit 21 and the charging unit price determination unit 23.

As a result, the exchange main unit 21 performs the predetermined exchange work, and determines whether or not the charging unit price is informed to the caller of the communication terminal 29. This is achieved, for example, by a method in which the receiver previously registers with the network whether or not to receive charging unit price information, and the exchange VI at the network side determines whether or not to make charging unit price information to the communication terminal 29 of the receiver according to information for specifying the communication terminal 29 of the receiver such as the called party number. Further, when the charging unit price is always informed, such determination is not required.

The charging unit price determination means 23 specifies the calling location, receiving location, and if necessary, the relay network, and determines the charging unit price with reference to the corresponding table of the table memory 24 according to the information. In this case, information of the calling location is supplied always from the called party number analysis means 22, but information of the receiving location may be supplied from another network, that is, the mobile terminal location database of the mobile communication network. The latter may correspond to the case where the receiving side communication terminal is a mobile terminal.

Further, there is a case where, without referring to the table of the table memory 24, inquiring another network per call, that is, the charging unit price database of a network for charging the communication fee (hereinafter referred to as charging network), the charging unit price is determined according to the supplied charging unit price. This corresponds to a case where the network of itself, that is, the network for informing the charging unit price (hereinafter referred to as informing network) is not a charging network.

Since actual determination method of charging unit price depends also on the structure of the called party number, it will be described later in detail.

The table memory 24 stores the calling locations, receiving locations, and if necessary, information of charging unit price specified by the relay network, as a table. In the table of the table memory 24, in addition to the case where the charging unit price data is previously formed as in the case where the network of itself (informing network) is the charging network, there is a case where the data of the charging unit price database owned by a charging network as another network, as in the case where itself is not a charging network, is previously downloaded.

The charging unit price information device 28 informs information on the charging unit price according to the charging unit price supplied from the charging unit price determination means 23 to the communication terminal 27 through the exchange main unit 21. This may be achieved by announcing the charging unit price, for example, by a voice message. For ISDN or the like, information on the charging unit price may be informed to the communication terminal 27 by an outband signal of D channel message or the like including information on the charging unit price, in which the device for controlling the outband signal of D channel control device or the like also has the function of the charging unit price information device 28.

The acknowledge unit 25, which is an optional component, is for the receiver receiving the charging unit price information to achieve transmission of the will as to whether or not the connection with the calling side communication terminal is continued, in which a predetermined signal transmitted by a predetermined operation of the receiver from the communication terminal 29 is processed to control the exchange main unit 21 to continue or cut the connection. The will in this case may be transmitted by an in-band PB signal or the like or, in ISDN, by the outband signal such as D channel message.

The relay network determination means 26, when there are a plurality of relay networks in parallel to the receiving network, selects one of them according to the caller's will, in which a predetermined signal transmitted from the communication terminal 27 is processed by a predetermined operation of the caller to control the exchange main unit 21 so that the receiving side communication terminal 29 can be connected through a predetermined relay network. However, the relay network in this case cannot be selected at the receiving side. This is because, when the charging unit price is informed, the relay network is already specified.

Figure 20:
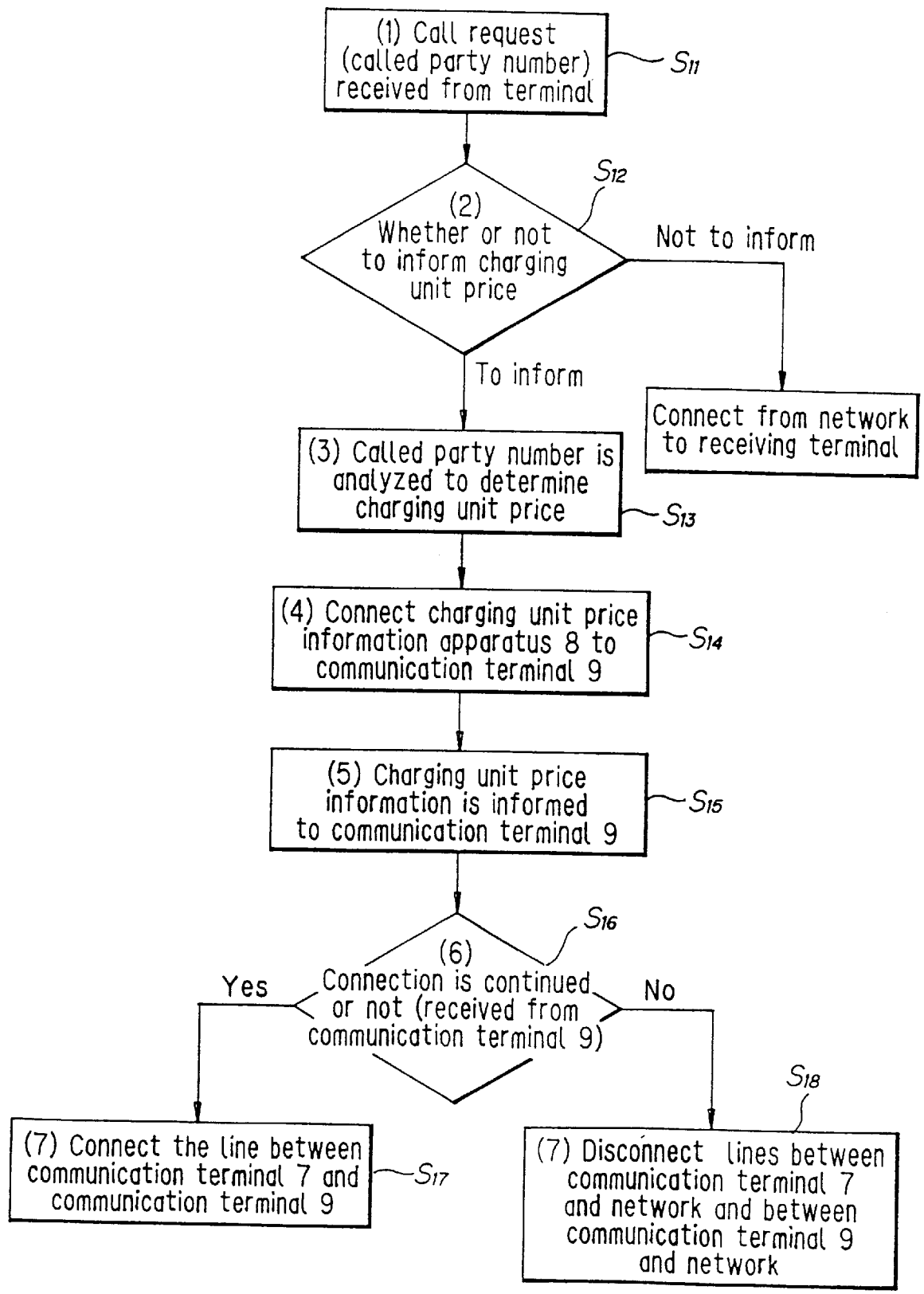
FIG. 20 is a flow chart showing the processing procedure in the apparatus shown in FIG. 19.

FIG. 20 is a flow chart showing the operation procedure at calling in the present embodiment. As shown in the Figure, when there is a call from the communication terminal 21 to a predetermined network, unit price of communication fee is informed from the network to the caller using the following procedure.

(1) The exchange main unit 21 receives a call request from the calling side communication terminal 27 (step S11).

(2) The exchange main unit 21 determines whether or not the charging unit price is informed to the receiver (step S12). As a result, when not to inform, the exchange work as in the past is performed to connect from the network to the communication terminal at the receiving side.

(3) When the charging unit price is informed, the charging unit price is determined by the charging unit price determination unit 23 according to the contents of the called party number analyzed by the called party number analysis unit 22 (step S13).

(4) The charging unit price information device 28 is connected to the communication terminal 29 (step S14). This is achieved, for example, by connecting the charging unit price information device 28 to one of the trunks of the exchange main unit 21, controlling the exchange main unit 21 to connect a trunk connected with the communication terminal 29 and a trunk connected with the charging unit price information device 28, and connecting the line from the trunk to the communication terminal 29. At this moment, when in ISDN or the like, the charging unit price is informed by an outband signal such as D channel message, it is not required to connect the communication line to the charging unit price information device 28.

(5) Charging unit price information is informed to the communication terminal 29 (step S15). In this case, information on the charging unit price includes the following. Communication fee per unit time (all or typical part of it when the unit price varies with passage of talk time) or communication fee to typical communication time (a single or a plurality of types).

(6) The receiver informs whether or not connection is continued from the communication terminal 29 to the network (step S16). In this case, signal supplied from the communication terminal 29 to the exchange main unit 21 is processed by the acknowledge unit 25.

(7) When the will to continue connection is confirmed in the acknowledge unit 25, the trunk connected with the line from the calling side communication terminal 27 and the trunk connected with the line from the receiving side communication terminal 29 are connected so that the communication line between the calling side communication terminal 27 and the receiving side communication terminal are finally connected (step S17).

(8) On the other hand, when there is no will to "continue connection", communication lines between the calling side communication terminal 27 and the network and between the receiving side communication terminal 29 and the network are disconnected (step S18).

Of the above procedures, step S13 and step S14 may be reversed.

<Determination of charging unit price>

Next, determination method of charging unit price as processing in step S13 will be described.

FIG. 21 shows classification of communication paths by network types from the calling side communication terminal 27 specified by analyzing the called party number to the receiving side communication terminal. As shown in the Figure, communication paths are divided into 8 types.

Further, concepts of communication system in the individual cases are shown in FIG. 22, FIG. 23, FIG. 24, FIG. 25, FIG. 26, FIG. 27, FIG. 28, and FIG. 29. In these Figures, VII is an informing network for informing the charging unit price, VIII is a mobile communication network, IX is a charging network for charging in communication, 30 is a mobile terminal location database, and 31 is a charging unit price information database. Of these, the mobile terminal location database 20 is in the mobile communication network VIII and stores the location of the mobile terminal 29. Still further, the charging unit price information database 31 is in the charging network IX and stores charging unit price information for charging.

Tables for the cases classified according to FIG. 21 are individually shown in FIG. 30, FIG. 31, FIG. 32, FIG. 33, and FIG. 34.

Charging unit price determination method for each of the 8 cases classified in FIG. 21 will be described in detail.

A. When lines are connected by a single network

Determination of charging unit price depends on whether the network connecting the communication lines is a fixed communication network or a mobile communication network. Charging unit price is determined from the called party number for the case of fixed communication network, whereas charging unit price is not always unitarily determined from the called party number in the mobile communication network, and charging unit price may depend on the location of the receiving side communication terminal.

(A-1) When charging unit price is unitarily determined from called party number

Figure 22:
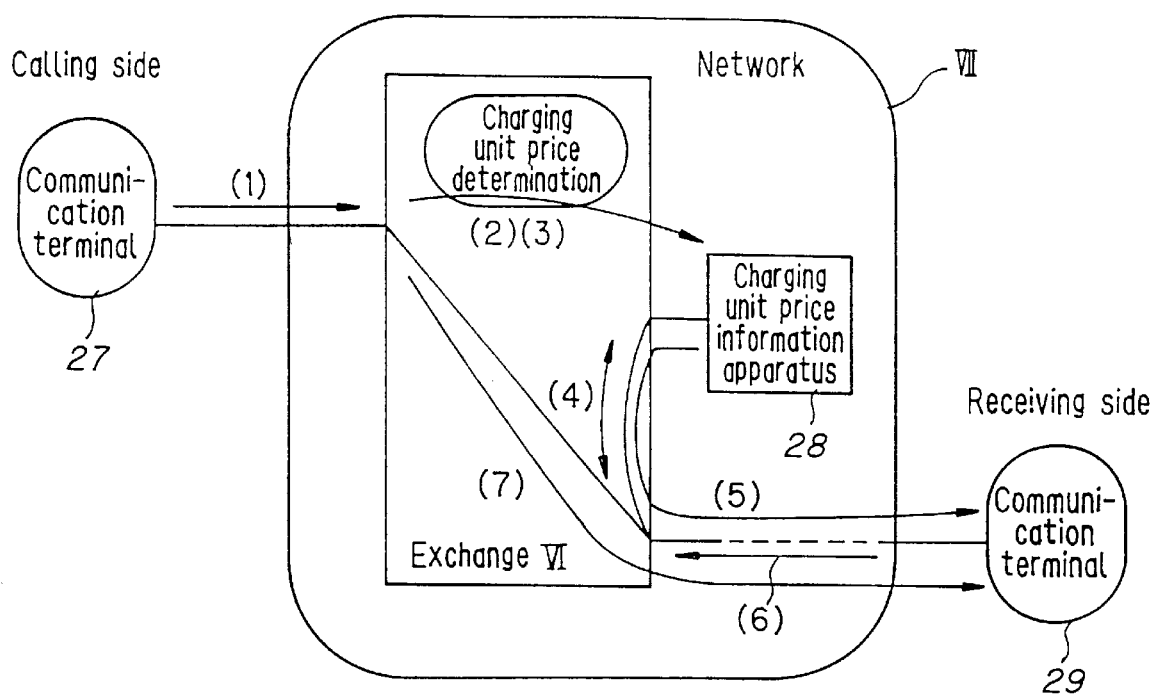
FIG. 22 is a diagram for explaining a first communication system according to an embodiment of the present invention.

Communication system in this case is shown in FIG. 22. In the Figure, parts similar to those used in FIG. 19 have similar reference numerals, and flow of signals corresponding to individual steps S11 to S18 in FIG. 2 are indicated as (1), (2), (3), (4), (5), (6), and (7) according to the suffix of the step number (this is also the same in FIG. 23 to FIG. 29).

The present example (A-1) is the case where the table memory 24 of the device shown in FIG. 19 stores the table shown in FIG. 30. Further, the present example is the case where the informing network VII is a charging network.

When the receiving location is unitarily determined from the called party number informed from the calling side communication terminal 27 to the informing network VII as in the case where the informing network VII is a fixed communication network, the charging unit price can be determined only by this condition. That is, since the informing network VII is also a charging network, a table to which the charging unit price can be referred from the calling location and the receiving location (and communication time zone) is provided in the informing network VII, and the table may be referred to when the receiving location is fixed at calling to determine the charging unit price.

For example, when a single fixed communication network in the domestic communication, the receiving location identification code (048) and the receiving destination subscriber's number (654 3210) are informed to the network VII at calling as the called party number $$048\ 654\ 3210,$$

since the network VII can detect the calling location, a table showing correspondence between the receiving location identification code and the charging unit price for every calling location is previously provided as shown in FIG. 30, the called party number is analyzed, and the charging unit price corresponding to the receiving location identification code (048) can be determined by referring to the table as 35 sec/10 yen.

When the charging unit price varies depending on the communication time, a table according to the communication time can be used. Further, when the charging unit price varies with the length of talk time, all charging unit prices according to the length of talk time can be provided on the table.

(A-2) When charging unit price depends on the location of the receiving side communication terminal 29

Figure 23:
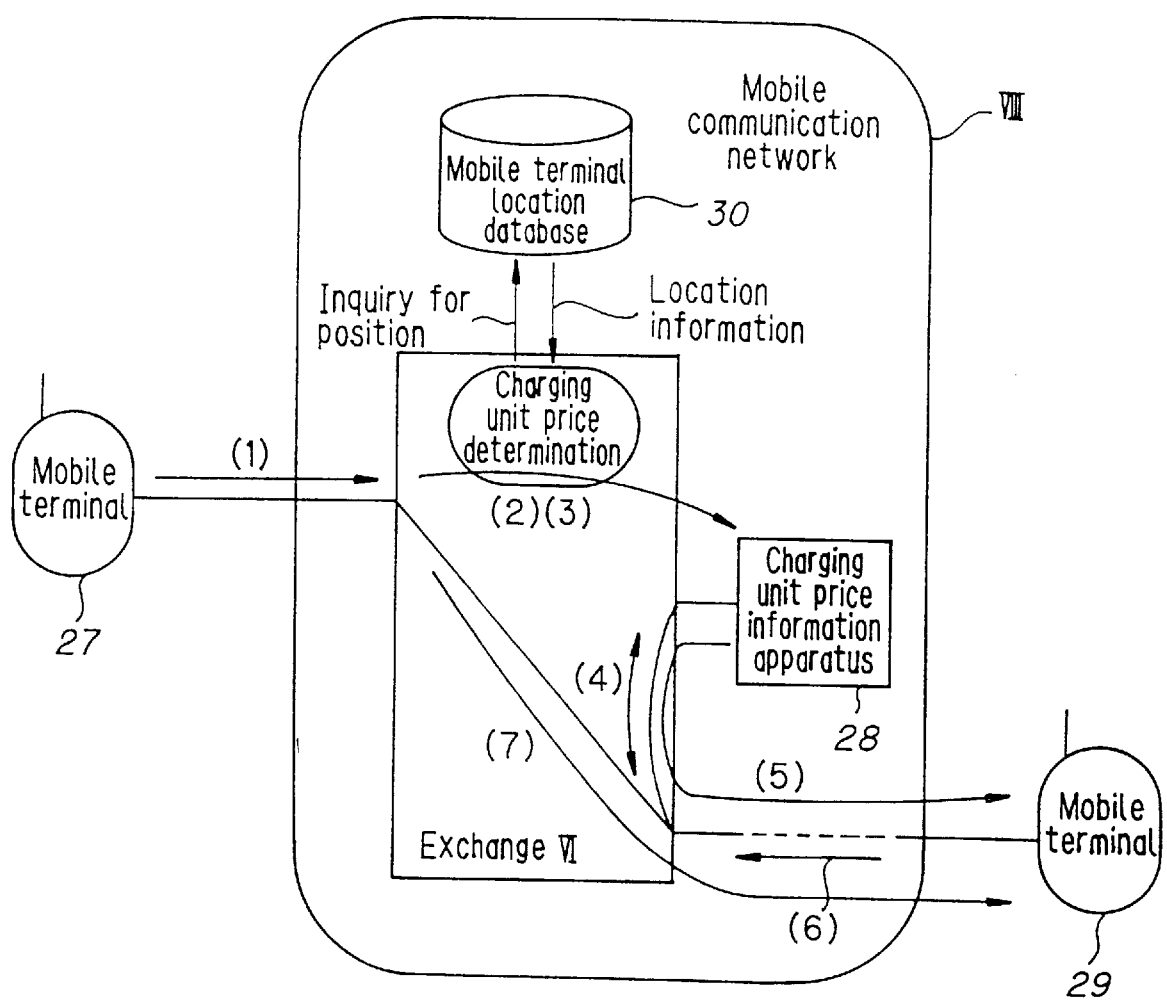
FIG. 23 is a diagram for explaining a second communication system according to an embodiment of the present invention.

The communication system in this case is as shown in FIG. 23. In the present example (limited for area undesignating system), the table memory 24 shown in FIG. 19 stores the table shown in FIG. 21, the mobile communication network VIII as the informing network also functions as the charging network, therefore the charging unit price determination unit 23 inquires the mobile terminal location database 30 of the location, and the communication terminal 29 at the receiving side as the mobile terminal can be specified.

In the mobile communication network VIII or the like, when the communication terminal 29 at the receiving destination is a mobile terminal or the like and the charging unit price varies with the location, since the receiving area can be known from the called party number informed at calling when calling in the area designating system, the charging unit price can be determined by the same method as (A-1).

When the receiving destination communication terminal 29 is a mobile terminal or the like and the charging unit price varies with the location, and when calling in the area undesignating system, reference is made to the mobile terminal location database 30 storing the location of the communication terminal 29 as the mobile terminal to know the location of the communication terminal 29, and the charging unit price can be determined from the information. That is, a table which the charging unit price can be referred to from the calling location and the receiving location (and communication time zone) is provided in the network VIII, and the charging unit price may be determined by referring to the table when the receiving location is fixed at calling.

For example, when calling a mobile terminal in the mobile communication network VIII, the mobile communication network access code (030), the mobile communication enterprise identification code (12) and the mobile terminal subscriber number (34567) are informed to the network VIII, as the called party number $$030\ 12\ 34567,$$

when it is to a terminal within the network of itself, the network VIII detects the mobile communication network access code (030) and the mobile communication enterprise identification code (12) to know that the receiving destination is the communication terminal 29 in the network of itself. Further, the network VIII can refer to the mobile terminal location database 30 registering the location for the location of the mobile terminal 29 which is the mobile terminal of the mobile terminal subscriber number (34567).

Then, as shown in FIG. 31, a table showing correspondence between the receiving location and the charging unit price for every calling location is previously provided, on receiving the location of the communication terminal 29 in response to the inquiry, the table can be referred to determine the charging unit price. For example, when calling from Tokyo, when it is informed that the location of the communication terminal 29 is in Saitama Prefecture, the charging unit price can be determined as 30 sec/10 yen.

Also when using a personal number as in personal communication, since the terminal to receive varies with the location of the receiver, the charging unit price can be determined by the same method as in the mobile terminal.

B. When the line is connected through a plurality of networks and the charging network informs the charging unit price When the communication line is connected through a plurality of networks such as local network (calling side, receiving side), relay network, mobile communication network and the like, normally the charging is made by one of the routing network. In this case, the method for determining the charging network differs depending on whether the charging network informs the charging unit price or a network other than the charging network informs the charging unit price.

When the charging network informs the charging unit price, since the charging network has the charging unit price information necessary for charging, the charging unit price can be informed utilizing the information.

At this time, determination of the charging unit price depends on whether the charging unit price is unitarily fixed from the called party number, or a plurality of charging unit prices are considered depending on the relay network, or the charging unit price depends on the location of the receiving terminal.

(B-1) When the charging unit price is unitarily determined from the called party number The charging unit price is unitarily determined from the called party number normally when the receiving destination is a fixed terminal. As a typical example, as shown in FIG. 35, the line is connected through the calling network (calling side fixed communication network or calling side mobile communication network), and one of the networks makes charging. At this time, since the relay network and the receiving location are unitarily determined from the called party number informed from the calling side communication terminal to the informing network VII (including a case where the relay network is tacitly designated), the charging unit price can be determined only by the information on the called party number and the calling location when charging is made by either network. That is, a table that can refer to the charging unit price from the calling location, relay network, and receiving location (and communication time zone) is provided in the communication network VII as the charging network, and the charging unit price may be determined by referring to the table when the relay network and the receiving location are fixed at calling.

For example, in domestic communication, when domestic relay network identification code (0088), receiving location identification code (048) and receiving destination subscriber number (654 3210) are informed at calling as the called party number 0088 048 654 3210, as shown in FIG. 32, a table showing correspondence between the domestic relay network identification code, the receiving location identification code, and the charging unit price for every calling location is previously provided in the charging network.

The informing network VII as the charging network can obtain information on the calling location by any method at calling. That is, when the calling network makes charging, since it is connected directly to the calling side communication terminal 27, the caller number or the subscriber interface identification number used by the caller or the like can be obtained as information on the calling location. When a network other than the calling network makes charging, that is, when the relay network or the receiving network make charging, information on the calling location or the calling location itself may be informed from the calling network. Further, when the relay network makes charging, the calling location may be identified from the identification number of the connection interface of the calling network and the relay network.

From the thus obtained information on the calling location and the result of called party number analysis, by referring to the table shown in FIG. 32, the charging unit price corresponding to the domestic relay network identification code (0088) and the receiving location identification code (048) can be determined as 48 sec/10 yen. Even when only the receiving location identification code (048) and the receiving destination subscriber number (654 3210) are informed to the network at calling, if the relay network is tacitly determined to one, the charging unit price can be determined using the same procedure.

Further, in international communication, for example, when international relay network identification code (001), country code (82), and domestic number (2 765 4321) of the receiving destination are informed to the network, as the called party number 001 82 2 765 4321, as shown in FIG. 33, the international relay network identification code, a table showing correspondence between the country code (and if necessary, receiving location identification code or part thereof of the individual nation) and the charging unit price is previously provided, by referring to the table after the analysis of the called party number, the charging unit price corresponding to the international relay network identification code (001) and the country code (82) can be determined as 15 yen/6 sec. Since, normally in international communication, the charge does not depend on the caller's location, that is, at present, the same charging unit price is applied when calling from any place in Japan, it is not always necessary to know information on the calling location in order to determine the charging unit price.

When the relay network makes charging and informs the charging unit price, since which relay network was selected is obvious, a table showing only correspondence between the receiving location identification code or the country code and the charging unit price may be used.

When the charging unit price varies with the communication time, a table according to the communication time may be used. Further, when the charging unit price varies with the length of talk time, all the charging unit prices according to the length of talk time can be provided in the table.

The communication system in this case is as shown in FIG. 22, in which the informing network VII is either the calling network, relay network or the receiving network, or in a case where the table memory 24 of the device of FIG. 19 stores the table shown in FIG. 32 or FIG. 33.

(B-2) A plurality of charging unit prices are considered depending on the relay network When charging is made at the calling network when the communication line is connected through the calling network (calling side fixed communication network or calling side mobile communication network), the relay network and the receiving network (receiving side fixed communication network), only the receiving location is unitarily determined by the number informed from the calling side communication terminal 7 to the network, and, as the relay network, as shown in FIG. 36, a plurality of candidates can be considered. In such a case, the charging unit price may also be determined for every relay network.

At this time, since the calling network as the charging network informs the charging unit price as the informing network VII, that is, since the charging network is not the relay network or the receiving network (in either of these cases, same as (B-1)), a table that can refer to the charging unit price from the calling location, relay network, and receiving location (and talk time zone) is provided in the calling network, and the charging unit price may be determined for every candidate relay network by referring to the table when receiving location is fixed by the analysis of the called party number.

For example, as in the above example, when only the receiving location identification code (048) and the receiving destination subscriber number (654 3210) are informed to the network at calling, and when there are a number of candidates as the relay network, the table as shown in FIG.

32 may be referred to for every candidate relay network to determine the charging unit price. That is, in this case, for 0070 relay network, the charging unit price can be determined as 40 sec/10 yen, and for 0077 relay network, the charging unit price can be determined as 48 sec/10 yen.

Further, in international communication, when international network access code (0XY), country code (82), and domestic number of the receiving destination (2 765 4321) are informed at calling, as a called party number

0XY 82 2 765 4321, and there are a number of candidates as international relay network, the charging unit price may be determined at the calling network by referring to the table as shown in FIG. 33 for every relay network as each candidate. That is, in this case, the charging unit price can be determined as 15 yen/6 sec for 001 relay network, 16 yen/6 sec for 0041 relay network, and 16 yen/6 sec for 0061 relay network.

The communication system in this case is as shown in FIG. 22, and when the table memory 24 of the device shown in FIG. 19 stores the table shown in FIG. 32 or FIG. 33, and when the caller can select one of the plurality of relay networks by the relay network determination unit 26.

(B-3) When the charging unit price depends on the location of the receiving side communication terminal 29

Figure 24:
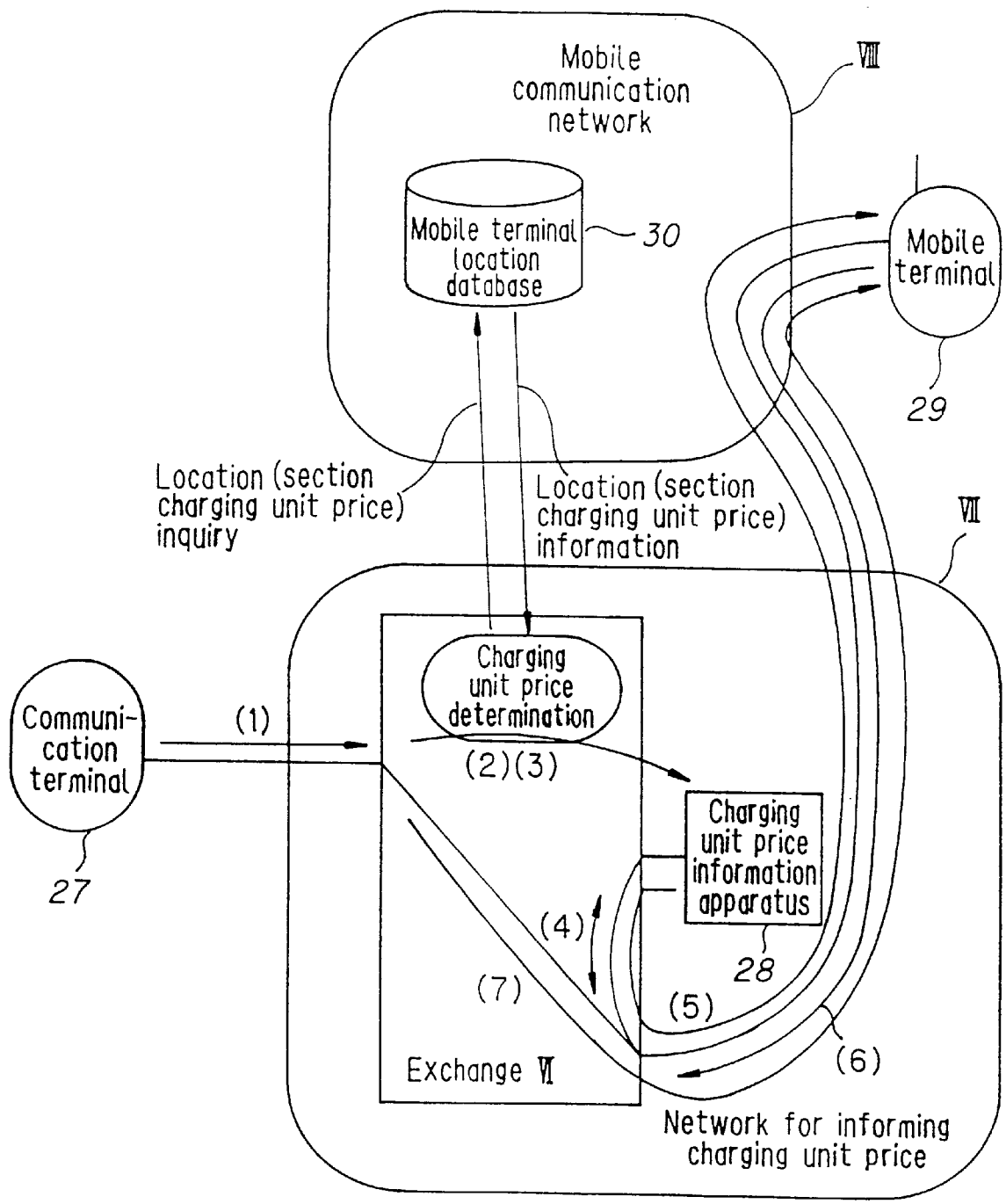
FIG. 24 is a diagram for explaining a third communication system according to an embodiment of the present invention.

The communication system in this case is as shown in FIG. 24. The present example (limited to area undesignating system) corresponds to a case where the table memory 24 of the device shown in FIG. 19 stores, for example, the table shown in FIG. 34, and the informing network VII as the charging network and the mobile communication network VIII are different networks. Therefore, the charging unit price determination means 23 can inquire the mobile terminal location database 30 in the mobile communication network VIII as another network of the location to specify the location of the receiving side communication terminal 29 as a mobile terminal.

In the present example, since the informing network VII is the charging network, and charging information of a network other than the mobile communication network VIII can be specified by the informing network VII, section unit price in the mobile communication network 30 according to the location of the communication terminal 29 may be supplied from the mobile terminal location database. Inquiry for the section unit price and reception of the notice at this time are performed by the charging unit price determination unit 23 of the device shown in FIG. 19, and table information in the table memory 24 is unnecessary.

When the charging unit price varies depending on the location such as because the receiving communication terminal 29 is a mobile terminal, and when calling in the area designating system, since the receiving area is known from the called party number informed at calling, the charging unit price can be determined by the same method as (B-1).

When the charging unit price varies depending on the location such as because the receiving communication terminal 29 is a mobile terminal, calling in the area undesignating system, and charging is made by the informing network VII other than the mobile communication network VIII as the receiving network (when the mobile communication network VIII is the informing network VII, the communication system is as shown in FIG. 23), reference is made to the mobile terminal location database 30 storing the location in the mobile communication network VIII for the location of the receiving side communication terminal 29 or section unit price determined by the location, and the charging unit price can be determined according to the information. That is, a table that can be referred to the charging unit price from the calling location and the receiving location (and talk time zone) is provided in the informing network (charging network) IX, and the charging unit price may be determined by referring to the table when the receiving location is fixed at calling. Or, when section unit price is informed from the mobile terminal location database 30, the section unit price may be converted to the charging unit price charged to the caller.

For example, when calling a mobile terminal, mobile communication network access code (030), mobile communication enterprise identification code (12), and mobile terminal subscriber number (34567) are informed to the network as the called party number 030 12 34567, the charging network detects the mobile communication network access code (030) to know that the receiving destination is a mobile terminal. Further, since the mobile communication enterprise identification code (12) is considered to indicate the enterprise or the location of the mobile terminal location database 30 registering the location of the communication terminal 29, the informing network VII can refer to the enterprise or mobile terminal location database 30 for the location of the communication terminal as the mobile terminal of the mobile terminal subscriber number (34567) or the section charging unit price.

When the location of the communication terminal 29 is informed to the inquiry, a table showing correspondence between the receiving location and the charging unit price for every calling location is previously provided as shown in FIG. 34, and the charging unit price may be determined by referring to the table. For example, when calling from Tokyo, when it is informed that the location of the communication terminal 29 is Saitama Prefecture, the charging unit price can be determined as 25 sec/10 yen.

When the section unit price is informed to the inquiry, the informed section unit price may be converted to the charging unit price. This can be converted by providing a function. As an achieving method of the function at this time, a conversion table may be referred.

When calling in area undesignating system, and charging is made by the mobile communication network VIII as the receiving network, in the same method as (A-2), the charging unit price can be determined in the mobile communication network III and informed. However, when it is necessary to specify the calling location for charging unit price determination, information on the calling location must be informed from the calling network or the like, but the calling location information is necessary for charging, it may be considered that calling location information may be informed from the calling network or the like with no problem whether or not the charging unit price is informed.

Also when using a personal number as in personal communication, since the receiving terminal varies with the location of the receiver, the charging unit price can be determined by the same method as in the case of mobile terminal.

C. When line is connected through a plurality of networks and the charging unit price is informed by a network other than charging network For a network other than the charging network IX to inform the charging unit price, it is necessary that information on the charging unit price is previously downloaded from the charging network IX or the like, or reference is made to the charging network IX per every call.

At this time, the method for determining the charging unit price differs depending on cases that the charging unit price is unitarily determined from the called party number, there are different charging unit prices depending on the relay network, or the charging unit price depends on the location of the receiving terminal.

Figure 25:
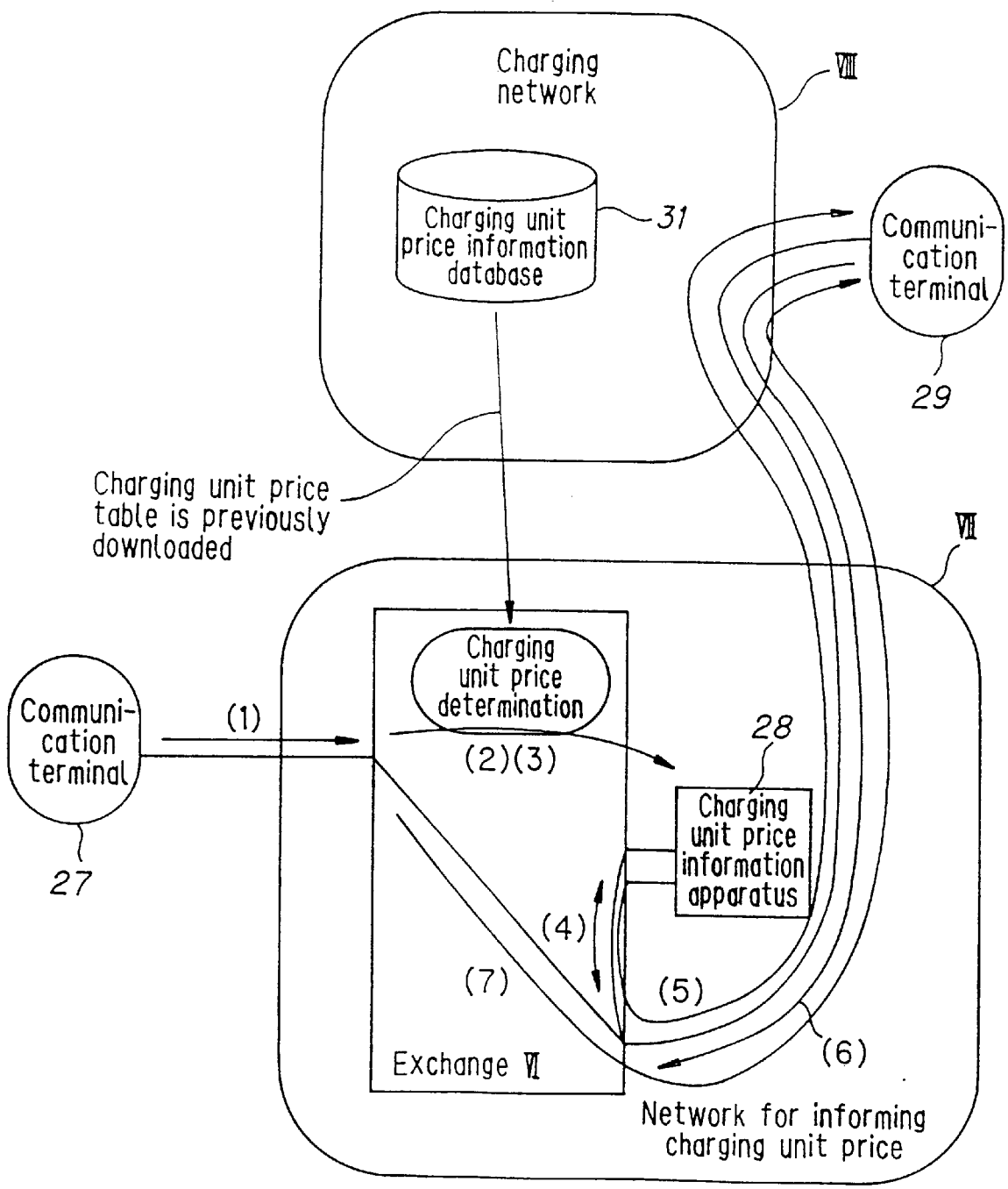
FIG. 25 is a diagram for explaining a fourth communication system according to an embodiment of the present invention.
Figure 26:
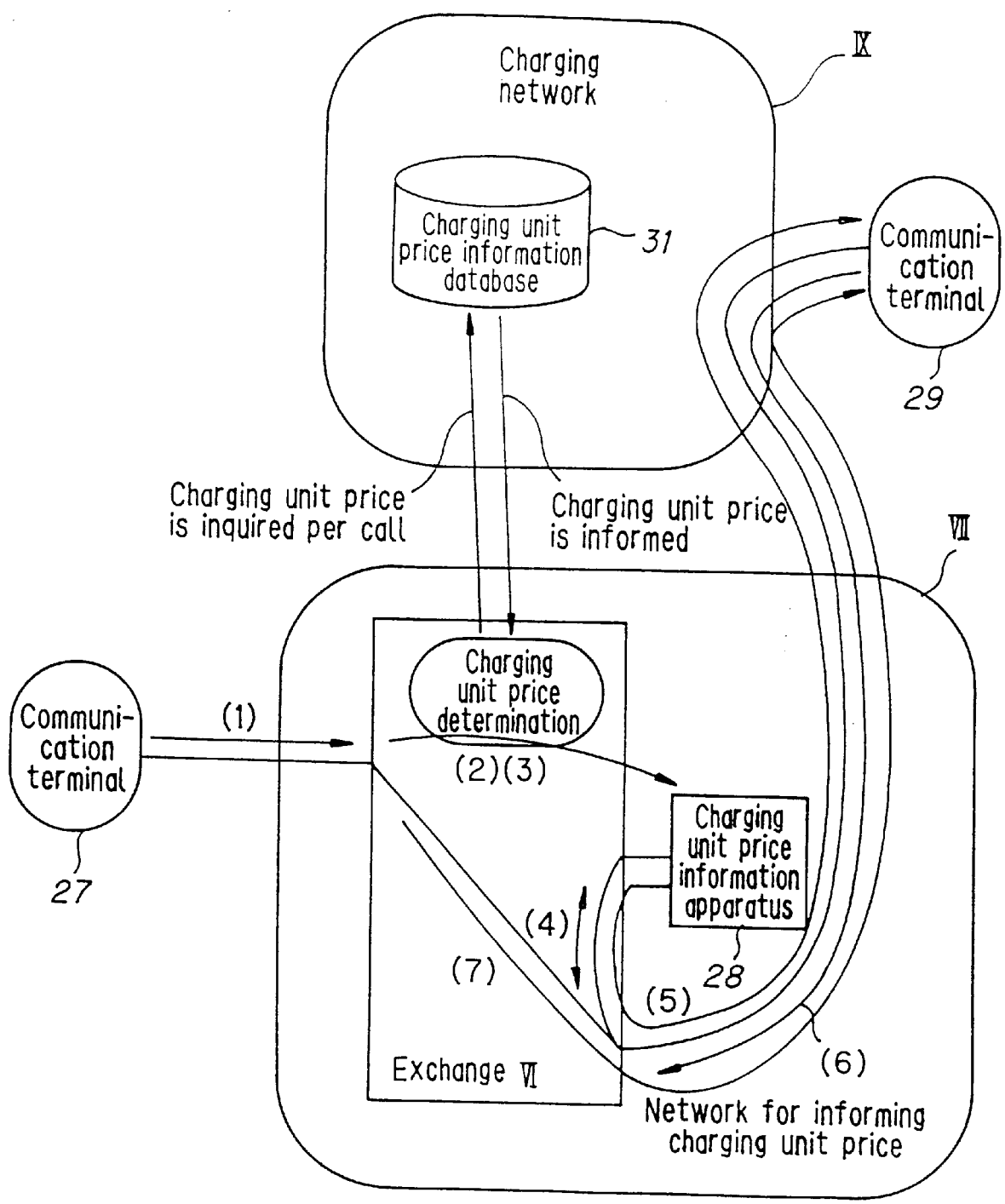
FIG. 26 is a diagram for explaining a fifth communication system according to an embodiment of the present invention.

(C-1) When the charging unit price is unitarily determined from the called party number The communication system in this case is as shown in FIG. 25 or FIG. 26. In the communication system shown in FIG. 25, when charging is made by the charging network IX different from the informing network VII, the table memory 24 of the device shown in FIG. 19 is previously downloaded with the contents of the charging unit price information database 31 of the charging network IX to prepare the table shown in FIG. 30, which is stored.

On the other hand, the communication system shown in FIG. 26 is for the case where the charging unit price information database 31 of the charging network IX is referred per every call. That is, this is the case where the charging unit price information database 31 functionally corresponds to the table memory 24 of the device shown in FIG. 19. Therefore, in this case, the table memory 24 is unnecessary.

As a method in which a network other than the charging network IX determines the charging unit price when the relay network and receiving location are unitarily determined (including a case where the relay network is tacitly designated) from the number informed from the calling side communication terminal 27 to the network, a table that can be referred to for the charging unit price from the calling location, relay network, and receiving location (and communication time zone) is previously downloaded from the charging network IX, and the charging unit price may be determined by referring to the table when the relay network and receiving location are fixed at calling. In this case, the charging unit price can be determined by the same method as (B-1).

As another method, as shown in FIG. 26, a method is considered in which the charging network IX is referred to from the informing network VII informing the charging unit price for the charging unit price per every call. In this case, the charging network IX receiving the inquiry may determine the charging unit price by the same method as in (B-1).

(C-2) When a plurality of charging unit prices are considered depending on the relay network In this case, a plurality of relay networks other than the informing network VII as the calling network are individual charging networks IX, therefore the communication system is the same as in (C-1) except that there are a plurality of relay networks as the charging networks IX, and basically has the same arrangement as that shown in FIG. 25 or FIG. 26. Further, also in this case, the caller can select one of the plurality of relay networks by the relay network determination means 26 as inn the case of (B-2).

In the present example, the communication line is connected through a plurality of networks, only the called party number is unitarily determined by the number informed by the calling side communication terminal 27 to the network, when there are a plurality of candidates as the relay network, the charging unit price may also be determined for each relay network. At this time, when each relay network makes charging, and the calling network which is not the charging network IX makes charging unit price information as the informing network VII, the calling network is previously downloaded with the table that can be referred to for the charging unit price from the calling location, relay network, and receiving location (and talk time zone) from the charging unit price information database 31 of the individual relay network (=charging network IX), and the charging unit price may be determined for every relay network as the candidate by referring to the table when the receiving location is fixed by the analysis of the called party number. In this case, the charging unit price can be determined by the same method as in (B-2).

Further, a method can also be considered in which the charging unit price is determined by referring to the individual relay network (=charging network IX) for the charging unit price from the informing network VII as the calling network which is not the charging network, and in this case the relay network which is referred to may determine the charging unit price by the same method as in (B-1).

Figure 27:
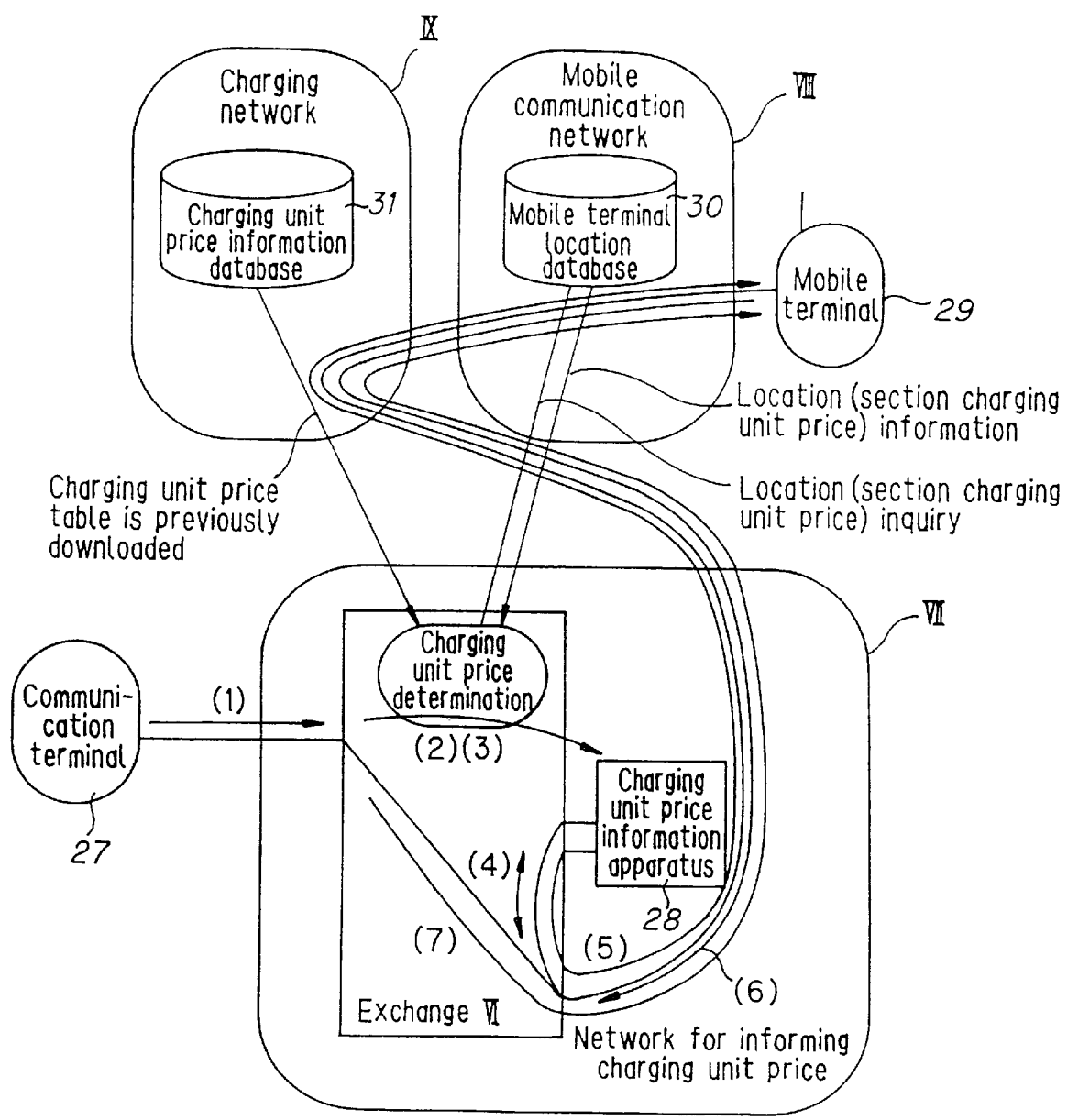
FIG. 27 is a diagram for explaining a sixth communication system according to an embodiment of the present invention.
Figure 28:
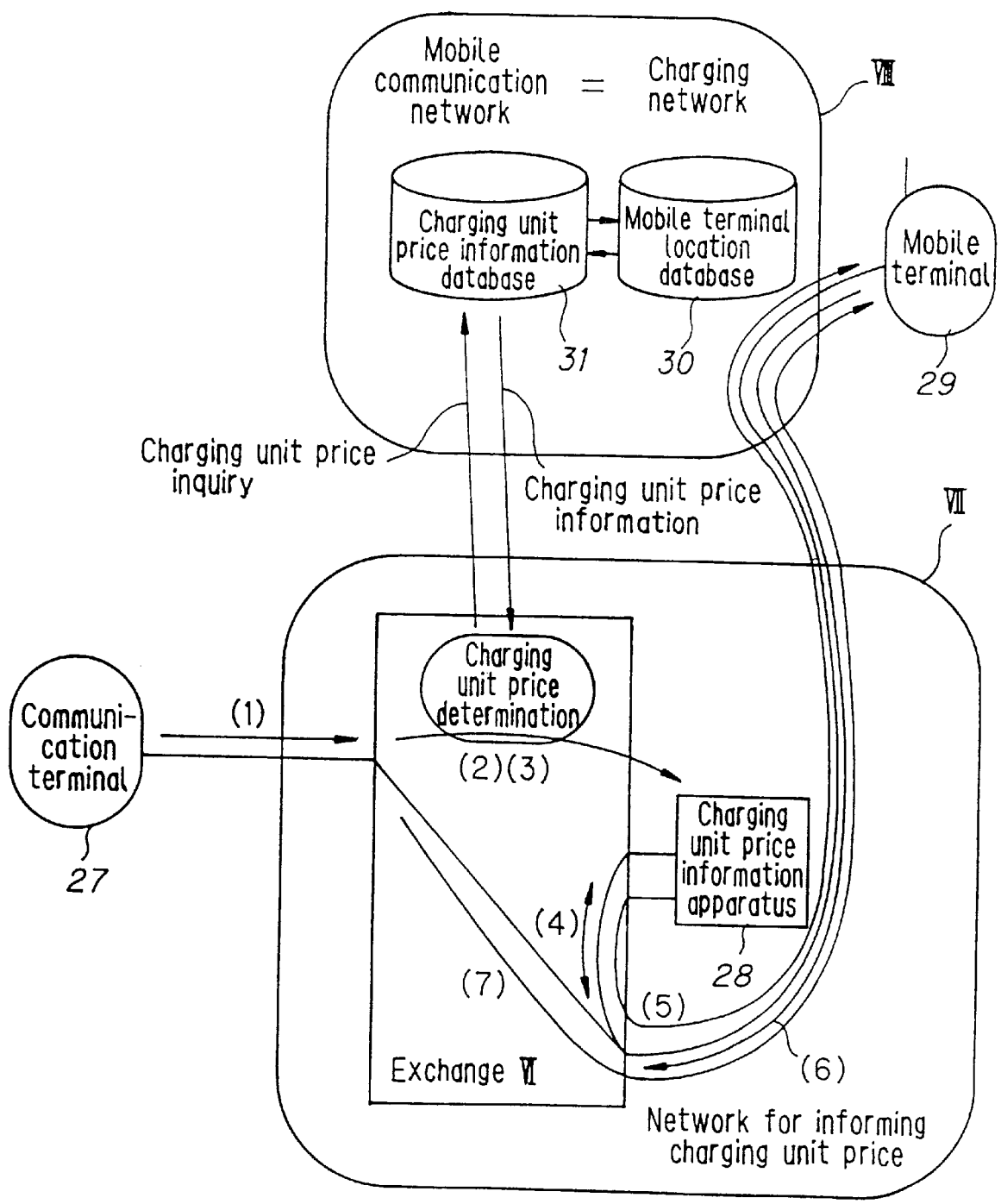
FIG. 28 is a diagram for explaining a seventh communication system according to an embodiment of the present invention.
Figure 29:
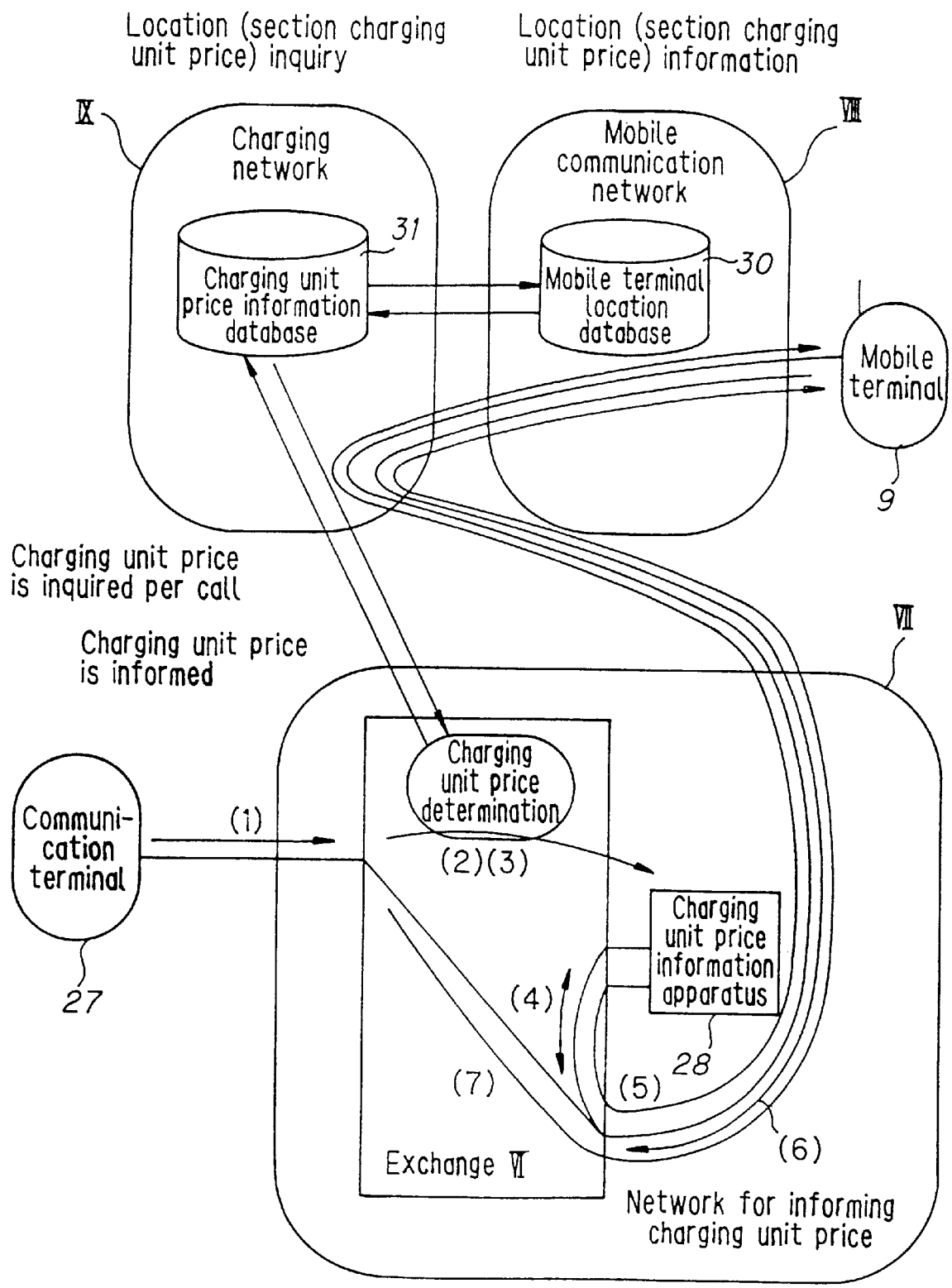
FIG. 29 is a diagram for explaining an eighth communication system according to an embodiment of the present invention.

(C-3) When the charging unit price varies with the location of receiving terminal The communication system in this case is one of those shown in FIG. 27, FIG. 28, and FIG. 29.

The communication system shown in FIG. 27 is for the case where the informing network VII as the calling network, the mobile communication network VIII as the receiving network, and the charging network IX as the relay network differ from each other, in which the informing network VII is previously downloaded and stored with the charging unit price information from the charging unit price information database 31 owned by the charging network IX for charging, the mobile communication network VIII refers to the mobile terminal location database storing the location of the communication terminal 29 as the mobile terminal of itself for the location of the communication terminal 29 or the section unit price, and the charging unit price is determined according to the information on the informed information on the location or section unit price.

That is, in the present example, the table memory 24 of the device shown in FIG. 19 is previously downloaded with the contents of the charging unit price information database 31 and stores the table, for example, shown in FIG. 34, the charging unit price determination means 23 communicates with the mobile terminal database 30, and the charging unit price determination means 23 refers to the table memory 24 according to the location of the communication terminal 29 as the mobile terminal to determine the charging unit price.

The communication system shown in FIG. 28 is for the case where the mobile communication network VIII as the receiving network is also the charging network. In the present example, since the charging unit price information database 29 grips the charging unit price using the location of the communication terminal 29 as parameters by communicating with the mobile terminal location database 30, the informing network VII as the calling network may refer to the charging unit price information database 31 for the charging unit price. Therefore, in the present example, the table memory 24 of the device shown in FIG. 19 is unnecessary, and the charging unit price determination means 23 determines the charging unit price by communicating with the charging unit price information database 31.

The communication system shown in FIG. 29 is for the case where the charging network IX as the relay network having the charging unit price information database 31 and the mobile communication network VIII as the receiving network having the mobile terminal location database 30 are divided as independent networks. Therefore, other parts may be the same as those used in the communication system shown in FIG. 28.

When the receiving destination is a mobile terminal or the like and the charging unit price varies with the location and calling in the area designating system, since the receiving area can be known from the called party number informed at calling, the charging unit price can be determined by the same method as in (B-1) by previously downloading the table that can be referred to for the charging unit price from the receiving area from the charging network. Further, it can also be considered that the charging unit price is determined by referring to the charging network per every call and, in this case, the charging network receiving the inquiry may determine the charging unit price by the same method as in (B-1).

When the receiving destination is a mobile terminal or the like and the charging unit price varies with the location and calling in the area undesignating system, reference is made to the mobile terminal location database 30 registering the location for the location of the receiving terminal or the section charging unit price determined by the location, and the charging unit price can be determined according to the information.

That is, as shown in FIG. 27, the network for informing the charging unit price is previously downloaded from the charging network IX with a table that can be referred to for the charging unit price from the calling location and the location of the receiving terminal (and communication time zone), and the charging unit price may be determined by referring to the table when the location of the receiving terminal is determined by referring to the mobile terminal location database 30 of the mobile communication network VIII at calling. Or, when the section charging unit price is informed from the database, it may be converted to the charging unit price charged to the caller. In practice, the charging unit price can be determined by the same method as in (B-3). In FIG. 27, the charging network IX and the mobile communication network VIII are different networks, but the same method can be used when the networks are same.

Further, the informing network VII for informing the charging unit price may refer to the charging network IX for the charging unit price per every call. When charging is made by the mobile communication network VIII, since the charging unit price can be determined by the mobile communication network VIII as shown in FIG. 28, it may be informed.

On the other hand, when the charging network IX and the mobile communication network VIII are different, as shown in FIG. 29, the charging network IX further refers to the mobile communication network VIII for the location of the receiving side communication terminal 29 or the section charging unit price determined by the location, and the charging network IX determines the charging unit price from the information.

If necessary for determining the charging unit price in the charging network IX, the calling area or the calling ID is informed to the charging network IX.

In each communication system of A to C, also when a number other than for reception is input for the purpose of changing the charging destination as in credit card call, information of the charging unit price can be made by the same method as above except for a special processing such as changing the charging destination.

Further, the above charging unit price information function as shown in C above can also be provided to PBX. In this case, the PBX may perform the function of the network for the charging unit price information described above.

In the above described example, the charging network is limited to one, however, the charging unit price information is also possible for the case where networks differing for the individual sections from the calling terminal to the receiving terminal make charging. When a network is to make charging in this case, the charging unit price is determined by the method shown in A or B for a section where the network makes charging, and the charging unit prices for other sections may be determined by the method as shown in C, which are combinedly informed.

As described above in detail with reference to the embodiments, with the present invention, including the case where the receiving side communication terminal is a mobile terminal, the receiving side can know the charging unit price in the present communication.

Further, since the will of the talker at the receiving side as to whether or not the communication is continued can be transmitted by the acknowledge means, continuation of the communication or the cut-off mode can be optionally selected after confirming the charging unit price.

What is claimed is:

1. A charging unit price determination/information apparatus comprising:

called party number analysis means for analyzing a called party number to specify a receiving location transmitted by a communication terminal at a calling side;

charging unit price determination means for specifying a communication path from a calling location to a receiving location, assessing a class of the communication path according to network type and dependency of unit price which is independent of the network type for each network type, and determining a charging unit price in accordance with said class, wherein the network type includes a first network type having a plurality of networks with a charging network providing unit price data, and a second network type having a plurality of networks with a network other than the charging network providing the unit price data; and charging unit price information means for informing information on the charging unit price determined by said charging unit price determination means to at least one of the communication terminal at the calling side and a communication terminal at a receiving side.

2. The charging unit price determination/information apparatus of claim 1, further comprising a table memory storing the charging unit price using the calling location and the receiving location or a relay network as parameters, wherein said charging unit price determination means determines the charging unit price by referring to the contents of said table memory.

3. The charging unit price determination/information apparatus of claim 2, wherein the table stored in said table memory is prepared by previously downloading charging unit price information storing information for charging owned by a charging network as another communication network to said table memory.

4. The charging unit price determination/information apparatus of claim 2, wherein said charging unit price determination means determines the charging unit price by referring to a mobile terminal location database owned by a mobile communication network as another communication network and a receiving network and storing the location of a mobile terminal as the communication terminal at the receiving side to specify the location of the communication terminal at the receiving side.

5. The charging unit price determination/information apparatus of claim 2, wherein said charging unit price determination means determines the charging unit price obtained by referring to a mobile terminal location database owned by a mobile communication network as another communication network and a receiving network and storing the location of a mobile terminal as the communication terminal at the receiving side and referring to a section charging unit price of the mobile communication network according to the location of the communication terminal at the receiving side.

6. The charging unit price determination/information apparatus of claim 1, wherein a charging unit price database owned by a charging network as another communication network and storing information for charging is referred to for the charging unit price using the calling location and the receiving location or a relay network as parameters, and said charging unit price determination means determines a charging unit price according to the charging unit price information obtained as a response to an inquiry, for a charging unit price using parameters of calling location and receiving location or relay network to a charging unit price database storing information for charging owned by a charging network as another communication network for the charging unit price.

7. The charging unit price determination/information apparatus of claim 1, when there are a plurality of parallel relay networks to the communication terminal at the receiving side, further comprising relay network determination means for selecting one of the plurality of relay networks according to the caller's will.

8. The charging unit price determination/information apparatus of claim 1, further comprising acknowledge means for connecting or disconnecting the communication line according to the caller's will as to whether the communication is connected or disconnected.

9. The charging unit price determination/information apparatus of claim 1, having said relay network determination means and said acknowledge means.

10. A communication system having a charging unit price information apparatus, the charging unit price information apparatus comprising:
 means for analyzing a called party number for specifying a receiving destination transmitted by a communication terminal at a calling side;
 means for specifying a communication path from a calling location to a receiving location;
 means for assessing a class of the communication path according to network type and dependency of unit price which is independent of the network type for each network type, wherein the network type includes a first network type having a plurality of networks with a charring network providing unit price data, and a second network type having a plurality of networks with a network other than the charging network providing the unit price data;
 means for determining the charging unit price in accordance with the class; and
 means for supplying information of the charging unit price to at least one of the communication terminal at the calling side and a communication terminal at a receiving side.

11. The communication system according to claim 10, wherein, when said class indicates communication is through a single communication network to the receiving side and a communication terminal at the receiving side is a mobile terminal, said means for specifying refers to a mobile terminal location database in the single communication network and stores the location of the mobile terminal, said means for determining refers to a table in the single communication network storing charging unit prices using the calling location and receiving location as parameters.

12. The communication system according to claim 11, wherein, when said class indicates communication is through a plurality of communication networks, including an informing communication network and a mobile communication network, to the receiving side, and the communication terminal at the receiving side is a mobile terminal belonging to a mobile communication network different from the informing communication network, said means for specifying refers to a mobile terminal location database in the mobile communication network and storing the location of the mobile terminal, said means for determining refers to a table in the informing communication network, the table having stored therein the charging unit price in accordance with the calling location and receiving location.

13. The communication system according to claim 10, wherein, when said class indicates communication is through a plurality of communication networks, including an informing network and a charging network, separate from said informing network, at the receiving side, said charging unit price information apparatus further includes a table prepared by previously downloading contents of a charging unit price information database in the charging network to a table memory in the informing communication network, and said means for determining refers to the table using the calling location and the receiving location or a relay network as parameters.

14. The communication system according to claim 10, wherein, when said class indicates communication is through a plurality of communication networks, including an informing network and a charging network, separate from said informing network, at the receiving side, said means for determining refers to contents of a charging unit price information database in the charging network using the calling location and the receiving location or the relay network as parameters.

15. The communication system according to claim 10, wherein, when said class indicates communication is through a plurality of communication networks, including an informing network, a charging network, separate from the informing network, and a mobile communication network at the receiving side, said informing network including a table prepared by previously downloading contents of a charging unit price information database, said means for specifying refers to contents of a mobile terminal location database in the mobile communication network, said means for determining refers to the table using the calling location and the receiving location.

16. The communication system according to claim 10, wherein the means for determining refers to a table in the communication terminal storing the charging unit price using a calling location and a receiving location or a relay network as parameters.

17. A communication system having a charging unit price information apparatus, said communication system being connected to a plurality of communication networks at a receiving side, said plurality of communication networks including an informing network for informing the charging unit price, a charging network, separate from the informing network, including a charging unit price information database, and a mobile communication network having a location information database storing the location of the mobile terminal as a communication terminal at the receiving side, and the mobile communication network is also the charging network and has both the charging unit price information database and the location information database, said charging unit price information apparatus comprises:
 means for directing, in response to an inquiry from the informing network to the charging unit price information database for the charging unit price, the charging unit price information database to refer to the location information database for the location;

means for providing the charging unit price according to the location to the informing network, the informing network determining the charging unit price; and means for supplying the charging unit price information to at least one of a communication terminal at a calling side and the communication terminal at the receiving side.

18. A communication system having a charging unit price information apparatus, said communication system being connected to a plurality of communication networks at a receiving side, said plurality of communication networks including an informing communication network for informing the charging unit price, a charging network, separate from the informing network, including a charging unit price information database, and a mobile communication network, separate from the charging network, having a location information database storing the location of the mobile terminal as a communication terminal at the receiving side, said charging unit price information apparatus comprises:

means for directing, in response to an inquiry from the informing network to the charging unit price information database for the charging unit price, the charging unit price information database to refer to the location information database for the location;

means for providing the charging unit price according to the location to the informing network, the informing network determining the charging unit price; and means for supplying the charging unit price information to at least one of a communication terminal at a calling side and the communication terminal at the receiving side.

19. A method for determining a charging unit price in a communication system comprising the steps of:

analyzing a called party number to specify a receiving location transmitted by a communication terminal at a calling side;

specifying a communication path from a calling location to a receiving location;

assessing a class of the communication path according to network type and dependency of unit price which is independent of the network type for each network type, wherein the network type includes a first network type having a plurality of networks with a charging network providing unit Price data, and a second network type having a Plurality of networks with a network other than the charging network providing the unit price data;

determining a charging unit price in accordance with said class; and supplying information on the charging unit price determined by said charging unit price determination means to at least one of the communication terminal at the calling side and a communication terminal at a receiving side.

20. The method according to claim 19, further comprising, when said class indicates there are a plurality of parallel relay networks to the communication terminal at the receiving side, selecting one of the plurality of relay networks according to the caller's will.

21. The method according to claim 19, further comprising, connecting or disconnecting the communication line according to the caller's will.

22. The method according to claim 19, wherein, when said class indicates communication through a single communication network at the receiving side and a communication terminal at the receiving side is a mobile terminal, said specifying step includes referring to a mobile terminal location database in the single communication network and storing the location of mobile terminal, and said determining step includes referring to a table in the single communication network storing charging unit prices using the calling location and receiving location as parameters.

23. The method according to claim 19, wherein, when said class indicates communication through a plurality of communication networks, including an informing communication network and a mobile communication network, separate from the informing network, at the receiving side, and a communication terminal at a receiving side is a mobile terminal belonging to the mobile communication network said specifying step includes referring to a mobile terminal location database in the mobile communication network and storing the location of the mobile terminal, and said determining step includes referring to a table in the informing communication network, the table having stored therein the charging unit price in accordance with the calling location and receiving location.

24. The method according to claim 19, wherein, when said class indicates communication through a plurality of communication networks, including an informing network and a charging network, separate from said informing network, at a receiving side, further comprising preparing a table by previously downloading contents of a charging unit price information database in the charging network to a table memory in the informing communication network, and said determining step includes referring to the table using the calling location and the receiving location or a relay network as parameters.

25. The method according to claim 19, wherein, when said class indicates communication is through to a plurality of communication networks, including an informing network and a charging network, separate from said informing network, at a receiving side, said determining step includes referring to contents of a charging unit price information database in the charging network using the calling location and the receiving location or the relay network as parameters.

26. The method according to claim 19, wherein, when said class indicates communication through a plurality of communication networks, including an informing network, a charging network, separate from the informing network, and a mobile communication network at a receiving side, the mobile communication network having a mobile terminal location database storing the location of the mobile terminal as a communication terminal at the receiving side, further comprising preparing a table in the informing network by previously downloading contents of a charging unit price information database, said specifying step includes referring to contents of the mobile terminal location database in the mobile communication network, said determining step includes referring to the table using the calling location and the receiving location.

27. The method according to claim 19, wherein said determining step includes referring to a table in the communication terminal storing the charging unit price using a calling location and a receiving location or a relay network as parameters.

28. A method for determining a charging unit price in a communication system connected to a plurality of communication networks at a receiving side, said plurality of communication networks including an informing network for informing the charging unit price, a charging network, separate from the informing network, including a charging unit price information database, and a mobile communication network having a location information database storing the location of the mobile terminal as a communication terminal at the receiving side, and the mobile communication network is also the charging network and has both the charging unit price information database and the location information database, comprising the steps of:

- directing, in response to an inquiry from the informing network to the charging unit price in formation database for the charging unit price, the charging unit price information database to refer to the location information database for the location;
- providing the charging unit price according to the location to the informing network, thereby determining the charging unit price; and
- supplying the charging unit price information to at least one of a communication terminal at a calling side and the communication terminal at the receiving side.

29. A method of determining a charging unit price in a communication system connected to a plurality of communication networks at a receiving side, said plurality of communication networks including an informing network for informing the charging unit price, a charging network, separate from the informing network, including a charging unit price information database, and a mobile communication network, separate from the charging network, having a location information database storing the location of the mobile terminal as a communication terminal at the receiving side, comprising the steps of:

- directing, in response to an inquiry from the informing network to the charging unit price information database for the charging unit price, the charging unit price information database to refer to the location information database for the location;
- providing the charging unit price according to the location to the informing network, the informing network determining the charging unit price; and
- supplying the charging unit price information to at least one of a communication terminal at a calling side and the communication terminal at the receiving side.

* * * * *